(12) United States Patent
Bammi et al.

(10) Patent No.: US 9,978,031 B2
(45) Date of Patent: May 22, 2018

(54) SYSTEMS AND METHODS FOR MONITORING AND DETECTING FRAUDULENT USES OF BUSINESS APPLICATIONS

(71) Applicant: FIS FINANCIAL COMPLIANCE SOLUTIONS, LLC, Jacksonville, FL (US)

(72) Inventors: Jwahar R. Bammi, Westford, MA (US); Bagepalli C. Krishna, Concord, MA (US); Robert Posniak, Nashua, NH (US); Joseph Walsh, Acton, MA (US)

(73) Assignee: FIS FINANCIAL COMPLIANCE SOLUTIONS, LLC, Jacksonville, FL (US)

( * ) Notice: Subject to any disclaimer, the term of this patent is extended or adjusted under 35 U.S.C. 154(b) by 132 days.

(21) Appl. No.: 14/082,753

(22) Filed: Nov. 18, 2013

(65) Prior Publication Data

US 2014/0081699 A1    Mar. 20, 2014

Related U.S. Application Data

(63) Continuation-in-part of application No. 11/803,439, filed on May 15, 2007, now Pat. No. 8,612,479, (Continued)

(51) Int. Cl.
   *G06F 17/30* (2006.01)
   *G06Q 10/06* (2012.01)
   (Continued)

(52) U.S. Cl.
   CPC ......... *G06Q 10/0635* (2013.01); *G06F 21/36* (2013.01); *G06F 21/552* (2013.01); *G06F 11/3476* (2013.01)

(58) Field of Classification Search
   CPC ......... G06F 17/30539; G06F 17/30067; G06F 17/30312
   (Continued)

(56) References Cited

U.S. PATENT DOCUMENTS 5,557,742 A    9/1996   Smaha et al.
5,819,226 A   10/1998   Gopinathan et al.
(Continued)

FOREIGN PATENT DOCUMENTS

WO   WO 2005081110   9/2005
WO   WO 2008018939   2/2008

OTHER PUBLICATIONS

Brown et al., "STEP: A Framework for the Efficient Encoding of General Trace Data," AMC, (2002):27-34 (8 pages).
(Continued)

*Primary Examiner* — Robert Beausoliel, Jr.
*Assistant Examiner* — Alexandria Bromell
(74) *Attorney, Agent, or Firm* — Finnegan, Henderson, Farabow, Garrett & Dunner LLP

(57) ABSTRACT

A systems and methods are described detect fraud in existing logs of raw data. There can be several disparate logs, each including data of disparate data types and generated by different and possibly unrelated software enterprise applications. The fraud management system aggregates and organizes the raw log data, extends the raw data with reference data, archives the data in a manner that facilitates efficient access and processing of the data, allows for investigation of potentially fraudulent usage scenarios, and uses the results of the investigation to identify patterns of data that correspond to correspond to high risk usage scenarios and/or process steps. In subsequent processing, archived data can be compared against the identified patterns corresponding to high risk usage scenarios to detect matches, and the inven-
(Continued)

tion thereby automatically detects high risk usage scenarios and issues appropriate alerts and reports.

20 Claims, 29 Drawing Sheets

Related U.S. Application Data which is a continuation-in-part of application No. 11/435,159, filed on May 16, 2006, now Pat. No. 9,026,467, which is a continuation-in-part of application No. 11/056,576, filed on Feb. 11, 2005, now abandoned.

(60) Provisional application No. 60/544,790, filed on Feb. 13, 2004.

(51) Int. Cl.
*G06F 21/55* (2013.01)
*G06F 21/36* (2013.01)
*G06F 11/34* (2006.01)

(58) Field of Classification Search
USPC .............. 707/711, 721, 734, 741, 768, 776; 726/25, 26
See application file for complete search history.

(56) References Cited

U.S. PATENT DOCUMENTS

| | | | |
|---|---|---|---|
| 5,826,005 A | 10/1998 | Fuller | |
| 5,873,094 A | 2/1999 | Talatik | |
| 6,126,330 A | 10/2000 | Knight et al. | |
| 6,374,369 B1 | 4/2002 | O'Donnell | |
| 6,556,964 B2 | 4/2003 | Haug et al. | |
| 6,601,048 B1 | 7/2003 | Gavan et al. | |
| 6,728,955 B1 | 4/2004 | Berry et al. | |
| 6,751,789 B1 | 6/2004 | Berry et al. | |
| 6,754,890 B1 | 6/2004 | Berry et al. | |
| 7,051,041 B1 * | 5/2006 | Miller ............... | G06F 17/30362 |
| 7,089,592 B2 | 8/2006 | Adjaoute | |
| 7,140,008 B2 | 11/2006 | Chilimbi et al. | |
| 7,177,864 B2 * | 2/2007 | Ekhaus ............. | G06F 17/30539 |
| | | | 707/776 |
| 7,698,348 B2 * | 4/2010 | Walker ............... | G06F 17/3048 |
| | | | 707/790 |
| 2002/0048369 A1 | 4/2002 | Ginter et al. | |
| 2002/0156756 A1 * | 10/2002 | Stanley ............. | G06F 17/30286 |
| | | | 706/47 |
| 2003/0037251 A1 * | 2/2003 | Frieder ................ | G06F 21/552 |
| | | | 726/23 |
| 2003/0103626 A1 * | 6/2003 | Stein ..................... | H04L 9/0625 |
| | | | 380/42 |
| 2004/0003042 A1 * | 1/2004 | Horvitz ............... | G06Q 10/109 |
| | | | 709/204 |
| 2004/0139070 A1 * | 7/2004 | Dysart ............. | G06F 17/30607 |
| 2005/0114375 A1 * | 5/2005 | Frieder ............. | G06F 17/30619 |
| 2005/0149741 A1 * | 7/2005 | Humbel ................. | B60R 25/04 |
| | | | 713/186 |
| 2005/0182750 A1 | 8/2005 | Krishna et al. | |
| 2005/0195975 A1 * | 9/2005 | Kawakita ............. | H04L 9/0822 |
| | | | 380/30 |
| 2005/0204349 A1 | 9/2005 | Lewis et al. | |
| 2005/0240756 A1 * | 10/2005 | Mayer .................. | G06F 9/4418 |
| | | | 713/2 |
| 2006/0039372 A1 * | 2/2006 | Sarkinen ................ | H04Q 11/04 |
| | | | 370/389 |
| 2006/0150162 A1 | 7/2006 | Mongkoismal et al. | |
| 2006/0212012 A1 * | 9/2006 | Carlos ............... | A61F 13/53743 |
| | | | 604/382 |
| 2006/0230391 A1 | 10/2006 | Alexander et al. | |
| 2007/0006168 A1 | 1/2007 | Dimpsey et al. | |
| 2007/0156677 A1 | 7/2007 | Szabo | |
| 2007/0260484 A1 * | 11/2007 | Kimmel ................ | G06F 19/322 |
| | | | 705/2 |
| 2010/0332583 A1 * | 12/2010 | Szabo ............... | G06F 17/30522 |
| | | | 709/202 |

OTHER PUBLICATIONS

Srivastava et al.,"ATOM a System for Building Customized Program Analysis Tools," ACM, (Mar. 1994) (27 pages).
International Search Report from International Patent Application No. PCT/US2005/0041311, dated Aug. 29, 2008 (2 pages).
Office Action dated Mar. 15, 2010, from pending U.S. Appl. No. 11/435,159 (25 pages).
Office Action dated Nov. 26, 2010, from pending U.S. Appl. No. 11/435,159 (7 pages).
Office Action dated Mar. 31, 2011, from pending U.S. Appl. No. 11/435,159 (31 pages).

\* cited by examiner

ESCHEAT FRAUD DETECTION
Signature Profile Setup for Each Process Step

930

- Feature Sets
- Processes
  - Account Printing
  - Doman Account Escheat Fraud
    - Tasks
      - Teller Login
        - Signatures
          - Teller Login
      - Customers Account Balan
        - Signatures
          - Check Account
      - Customer Address Update
      - Payment from Customer ☐ Check Account Balance — 931
  Signature

[Events] [XML] [Properties]

Insert  Clone  Edit  Delete  Indent  Unindent  Stop  Join  Clear All

→ Bank Transactions Account Transaction Balance[]
→ Bank Transactions Account Transaction Balance[] — 932

☐ Event Parameters
  Bank Transactions Account Transaction Balance[]

| Parameters | Named | Of Type | Matches | Return As |
|---|---|---|---|---|
| ☐ Aug0 | Teller Id | LONGLONG | (Any) | Value |
| ☐ Aug1 | Customer Id | LONGLONG | (Any) | Value |
| ☐ Aug2 | Account Number | LONGLONG | (Any) | Value |
| ☐ Aug3 | Balance | DOUBLE* | (Any) | Value |
| ☐ Aug4 | Last Transaction | BSTA* | (Any) | Value |

ESCHEAT FRAUD DETECTION
Account Lookup

☐ Concord National Bank
Access  Customer Lookup  Print  Test
☐ *Concord National Bank*

Customer Master List

| Customer ID | Last Name | First Name | Address |
|---|---|---|---|
| 53346897011 | Guiness | Alex | 35 Forest Ridge Rd Concord, MA 01742 |
| 54698792130 | Smith | John | 125 Broadway Concord, MA 01742 |
| 55132467890 | Smith | Ben | 456 Beacon Street Concord, MA 01742 |

ESCHEAT FRAUD DETECTION
Address Change

☐ Concord National Bank  
Access  Customer Lookup  Print  Test  
☐ *Concord National Bank*

Info | Savings | Checking |

Customer Information

First Name: [Alex] ⟵961  Last Name: [Guiness] ⟵961  Customer Id: [5324697211] ⟵961

Address: [35 Forest Ridge Rd.]  
City: [Concord]  Home Phone: [9785442212]  
State: [MA]  Zip: [01742]  Work Phone: [9785441212]  } 963

962 {

Save  Cancel

*Account Summary*

| Account Type | Account Number | Balance |
| --- | --- | --- |
| Savings | 1289012945 | $11,211.10 |
| Checking | 2789012345 | $325.75 |

ESCHEAT FRAUD DETECTION
Make Payment

☐ Concord National Bank
Access  Customer Lookup  Print  Test
☐ *Concord National Bank*

Info | Savings | Checking |

Savings
Name: Old savings account          Customer id: 5324689701
Account: 1789012345              Last Transaction: 1/13/2005 10:09:26 AM
Balance: $11,211.10               Last Access: 1/21/2005 6:00:48 AM Transfer | Withdrawal | Pay Bills | Print |

Name: Jack Manager
Address: 45 Old Mill Road
City: New Jonestown
State: NH   Zip: 23555
Amount: 400                                    Pay

FIG. 9F

ESCHEAT FRAUD DETECTION
Sample Generated Report
(Accounts Affected by Fraud)

| Account Number | Name | Amount | Last Accessed | Teller |
|---|---|---|---|---|
| 218043 | Jack Frost | $200 | 1/12/05 1:15 PM | Jack Manager |
| 45 | Jill Hillman | $20 | 1/15/05 8:00 AM | Jane Teller |
| 322 | Fred Simpson | $300 | 1/15/05 8:10 AM | Jane Teller |
| 5600 | Joan Simpkin | $500 | 1/16/05 8:12 AM | Jane Teller |
| 599 | Deepak Chopra | $200 | 1/16/05 1:00 PM | Jack Manager |

SYSTEMS AND METHODS FOR MONITORING AND DETECTING FRAUDULENT USES OF BUSINESS APPLICATIONS

CROSS-REFERENCE TO RELATED APPLICATIONS

This application is a continuation of and claims priority to U.S. patent application Ser. No. 11/803,439, filed May 15, 2007, which is a continuation-in-part and claims priority to and the benefit of U.S. patent application Ser. No. 11/435,159, filed May 16, 2006, which claims priority to and the benefit of U.S. patent application Ser. No. 11/056,576, filed on Feb. 11, 2005, which claims priority to and the benefit of U.S. Provisional Patent Application 60/544,790, filed on Feb. 13, 2004, the contents of all of which are incorporated by reference herein in their entirety.

BACKGROUND

The inability to quantify, demonstrate, and monitor information technology (IT) business value, or assess in a timely, reliable, and efficient manner exposure of an enterprise's business processes to risk and loss, consistently ranks among the top complaints expressed by corporate officers and business enterprise managers. To improve the efficiency of business process execution in support of corporate goals and objectives, business executives partner with IT specialists to develop custom applications, or customize commercially-available, off-the-shelf, packaged applications. However, in spite of these attempts, questions linger over whether these applications deliver the expected process benefits, whether they work as expected, or whether they create unexpected process risks.

Current techniques for measuring and monitoring factors that impact business value and risk exposure generally fall into three categories: (1) Conducting manual surveys, audits, and polls about whether the application or process in question is delivering the expected value and is sufficiently immune to risk; (2) Enhancing and changing the enterprise software application to be monitored to produce log files that contain evidence of whether the application or process in question is delivering the expected value or has been exposed to risk through negligence or abuse; and (3) Applying business intelligence or rules-based technologies to existing log files to discover whether the application or process in question is delivering the expected value or being compromised by exposure to risk.

The current techniques to measure and monitor business value and risk exposure are manual, imprecise, or home-grown ad-hoc measurement techniques that can be expensive, time consuming, unreliable, and inefficient, involving nontrivial overhead, and often resulting in significant costs and losses for the business enterprise.

SUMMARY OF THE INVENTION

In one embodiment, the invention provides a method for managing fraud related to the use of one or more applications. In particular, the method aggregates and organizes a log of raw data associated with process steps of the use of the applications, archives the data in a manner that facilitates efficient access and processing of the data, investigates potential fraudulent scenarios using the archived data, and uses the results of the investigations to identify patterns of data that correspond to high risk usage scenarios and/or process steps. In subsequent processing, archived data can be compared against the identified patterns corresponding to high risk usage scenarios to detect matches, and the invention thereby automatically detects high risk usage scenarios and issues appropriate alerts and reports.

In one aspect, the invention can, within a single framework, aggregate and process raw data provided in a wide variety of different types and forms and stored in separate logs. In another aspect, the methods archive vast quantities of raw data using, for example, inverted indexing in order to make the processing of vast quantities of transactional data for fraud management not only practically possible but also efficient. In another aspect, the invention provides a rapid and automatic method for detecting potentially fraudulent usage scenarios using evidence collected from past experience, and issuing appropriate alerts and reports upon detection. In still another aspect, the invention may not require instrumenting the code of an enterprise application. Moreover, it can process raw data from one or both of transaction records implicitly derived from an instrumented enterprise applications and transaction records explicitly rated by non-instrumented applications.

BRIEF DESCRIPTION OF THE DRAWINGS

The following figures depict certain illustrative embodiments of the invention. These depicted embodiments are to be understood as illustrative of the invention and not as limiting in any way.

FIG. 9A-9F depict exemplary computer screenshots associated with steps of an embodiment of the software instrumentation systems and methods directed to detecting bank account escheat fraud of the type depicted in FIG. 8;

FIG. 10A-10C depict exemplary reports generated by an embodiment of the software instrumentation system and method directed to detecting bank account escheat fraud of the type depicted in FIG. 8;

DETAILED DESCRIPTION OF ILLUSTRATIVE EMBODIMENTS

Figure 1:
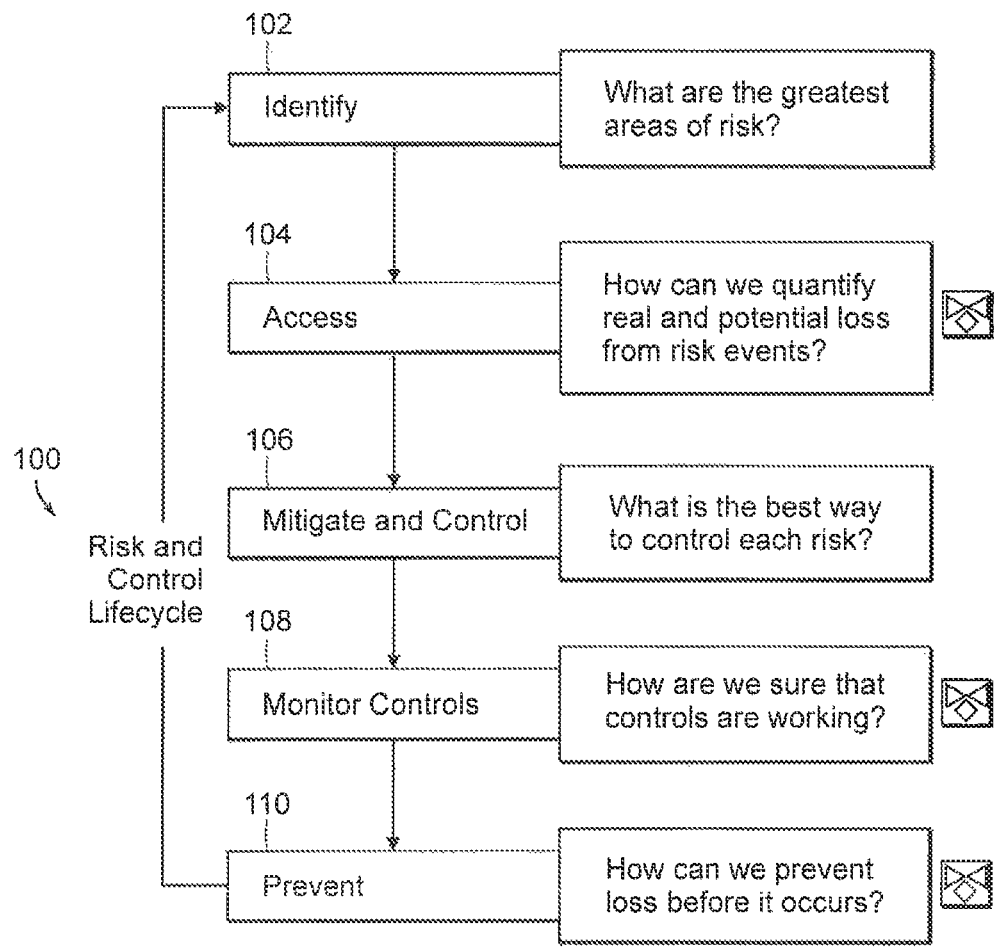
FIG. 1 depicts applications of the software instrumentation systems and methods of the invention to a risk mitigation and control monitoring lifecycle in a business process.

To provide an overall understanding of the invention, certain illustrative practices and embodiments will now be described, including a method for instrumenting one or more software applications and a system for doing the same. The systems and methods described herein can be adapted, modified, and applied to other contexts; such other additions, modifications, and uses will not depart from the scope hereof.

In one aspect, the systems and methods described herein are designed based on the premise that the value of an enterprise software application is realized, and its exposure to risk is reduced or eliminated, if it is used according to properly-selected, intended scenarios. These scenarios are interchangeably referred to herein as use cases, usage scenarios, or operations.

The invention will be discussed in two parts. Part 1 discusses embodiments of the invention in which software applications are instrumented. Part 2 discusses embodiments of the invention which do not require instrumentation of applications, and in particular are versatile enough to process transactional data generated from both instrumented and non-instrumented applications.

Part 1: Instrumenting Applications

According to one practice, the invention is directed to software instrumentation systems and methods for modeling and monitoring usage scenarios of enterprise software applications that at least partially support, implement, or automate business process goals. In a particular embodiment, the systems and methods described herein employ a software engine that monitors execution of enterprise software applications for occurrence of one or more defined usage scenarios in the execution of those applications, thereby providing users with a precise, dynamic assessment of expected-versus-actual value from the applications and/or business processes. Business processes can span multiple enterprise software applications, and multiple processes can be monitored simultaneously by the systems and methods described herein.

In contrast to other technologies which are typically expensive and yield subjective, qualitative estimates of risk, the systems and methods described herein, in one embodiment, monitor enterprise business processes to provide objective and quantitative risk and loss event information having specified or desired granularity; this enables the users to accurately and dynamically assess the enterprise's exposure to risk and associated potential or real losses. By providing to the users assessments of value and/or risk, the systems and methods of the invention enable the users to redefine business processes, reengineer corresponding enterprise software applications, and adjust usage scenarios to mitigate and control risk or to improve value derived from the business processes of the enterprise.

Internal fraud, and susceptibility to it, is a form of risk exposure that poses significant, challenging, and dynamically-changing problems for a variety of business enterprises. Financial losses due to fraud are particularly palpable in the banking industry. The U.S. Department of Justice, in a 2003 FBI report titled "Financial Institution Fraud and Failure Report," identifies a commercial banker who embezzled about $2,100,000 over a 2.5-year period. She did so at least in part by opening bank accounts under fictitious names and then transferring funds from her bank's internal expense accounts to the fictitious accounts. She raided the internal expense accounts in small increments—presumably to avoid detection—but averaged about 60-100 debits per month. According to the report, on the first of every subsequent month, the banker wrote a large check from one or more of the fictitious accounts which she subsequently deposited into her personal account. The fraud scenario highlighted above involves unusual banking activity; for example, the banker completed an average of about 60-100 transactions per month.

In one embodiment, the software instrumentation systems and methods described herein monitor the bank's business processes for—and thereby deter, control, or at least mitigate real or potential losses due to—such a rogue activity. In one aspect, the systems and methods of the invention identify and detect key indicators of risk as part of the monitoring of the business processes. To better understand bow the software instrumentation systems and methods disclosed herein can be employed for risk detection, assessment, mitigation, and control, a high-level description of a business enterprise risk and control lifecycle will now be presented.

FIG. 1 depicts a risk and control lifecycle 100 illustrating challenges faced by finance, risk, audit, line-of-business, IT, and other professionals and users who want to mitigate risk and monitor controls in the business processes of the enterprise. In particular, FIG. 1 illustrates three exemplary phases—104, 108, and 110—of the lifecycle 100 where the systems and methods described herein can be employed to advantage.

The lifecycle 100 begins, in step 102, by identifying one or more areas of risk in an enterprise, and potential losses resulting from those risk areas. Typically, this task is performed by corporate executives, IT staff, or other users familiar with the business objectives and needs of the enterprise and business processes that underlie or guide the design of enterprise software applications. Once the areas of risk have been identified, the systems and methods of the invention monitor the enterprise software applications to detect and assess, in step 104, real or potential losses associated with those risks. Additionally, the systems and methods of the invention provide for an independent verification of subjective self-assessments produced by other technologies, thereby increasing the likelihood of devising and deploying, in step 106, more appropriate risk mitigation and control procedures and infrastructure for the enterprise.

In step 108 of the lifecycle 100, the software instrumentation systems and described herein monitor the risk mitigation and control procedures and infrastructure devised in step 106 to assess their effectiveness. Typically, risk control procedures and infrastructures are tested frequently: an expensive and time-consuming overhead activity. The systems and methods described herein, however, reduce or eliminate such overheads by, in one embodiment, dynamically, even continuously, monitoring the risk mitigation and controls for rogue processes that may circumvent the controls and create new or elevated risks.

Proceeding through the risk and control lifecycle 100, step 110 includes institutionalizing or otherwise adopting loss prevention or reduction measures. The software instrumentation systems and methods described herein help prevent, or substantially reduce, risk-based losses by detecting risk indicators associated with risk hypotheses propounded by enterprise business process developers or software application designers.

Many risks cannot be fully controlled, or their corresponding losses prevented, by prior art technologies, especially as enterprises adapt their business processes in response to dynamically-changing business conditions, climates, and landscapes. However, in a typical embodiment, the software instrumentation systems and methods described herein can be rapidly deployed—with little or no change to the enterprise applications—to test risk hypotheses and monitor associated quantitative indicators of risk, thereby preventing, or preemptively reducing, loss before it occurs.

Given the magnitude of fraud in the banking industry, and to further illustrate various risk mitigation, control monitoring, and loss prevention aspects and features of the software instrumentation systems and methods described herein, examples will now be provided for detecting and preventing fraud at a retail bank. It will become apparent how the systems and methods of the invention can monitor the business processes of a financial institution—such as the bank that fell victim to the rogue activities of the banker, in the case of fraud reported by the FBI and referred to above—to avoid, substantially diminish the likelihood of eliminate, or otherwise mitigate losses related to fraud risk.

In an exemplary application, a global retail bank faced losses from fraud committed by tellers in some branch offices. Bank security officials developed fraud hypotheses that included the following: (a) more than normal customer access by recently-hired tellers is strongly correlated with identity theft; and (b) activation of a dormant account followed by a payment from that account is an indicator of fraud. The bank's security officials determined that monitoring these teller activities allows them to collect specific risk event data and quantify real and potential losses, thereby preventing or preemptively reducing fraud before it occurs.

The software instrumentation systems and methods described herein can be quickly deployed to monitor the teller activities specified in the fraud hypotheses above. Monitoring is quick, easy, and specific. And the systems and methods of the invention allow for collection of branch-specific risk, event data and teller activity.

Exemplary steps that an embodiment of the software instrumentation systems and methods of the invention perform as part of monitoring enterprise software applications will now be described. Although the description is in the context of potential fraud at a retail bank, other applications do not depart from the scope hereof.

Figure 2:
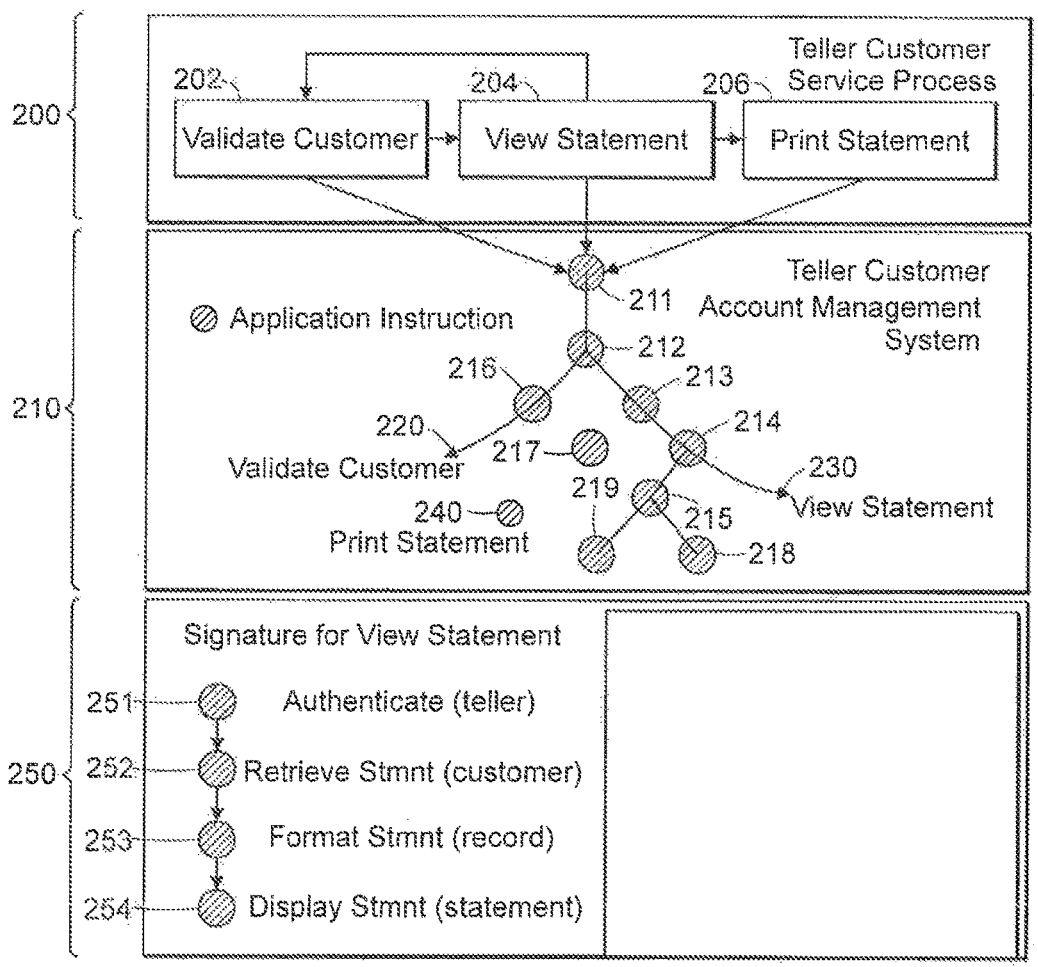
FIG. 2 depicts schematically various exemplary steps of software usage monitoring according to an embodiment of the instrumentation systems and methods.

FIG. 2 depicts three exemplary steps 200 involved in a customer service process performed by a teller. In step 202, the teller logs in and validates a customer. Then, in step 204, the teller views the customer's bank statement. In optional step 206, the teller prints a copy of the customer's bank statement or other bank record.

Each of the process steps 202, 204, and 206 is associated with a corresponding set of software events (e.g., application code instructions) in a teller-customer Account Management System 210, which includes a suite of one or more enterprise software applications. According to one practice, as each step of the customer service process is demonstrated (executed)—typically in a development environment—the software instrumentation systems and methods described herein trace the software events associated with the step. As shown in FIG. 2, events 211-219 are traced when the three steps 202, 204, and 206 of a customer service process are performed by the teller. In one embodiment, the systems and methods of the invention use the traced events (e.g., the traced application code instructions) to build a signature profile for one or more of the process steps.

For example, in the embodiment depicted by FIG. 2, the Validate Customer process 202 is represented by the signature profile defined by the application code instructions (events) 211, 212, and 216. This is also indicated by a Validate Customer trajectory 220. Also shown in the embodiment depicted by FIG. 2 is that the systems and methods described herein associate the View Statement step 204 with the signature profile specified by the events 211-214. This is also indicated by a View Statement trajectory 230. When the Print Statement step 206 is demonstrated, the systems and methods of the invention determine that the corresponding signature profile is specified by events 211-215, which collectively define the Print Statement trajectory 240.

According to FIG. 2, events 217-219 are not incorporated into the signature profile of any of the steps 202, 204, or 206. That is, the events 217-219 are discarded by the systems and methods described herein during the process of signature profile construction.

FIG. 2 also shows—using application code instruction detail—an embodiment of a View Statement signature profile 250. In this embodiment, the steps Authenticate(teller) 251, RetrieveStmnt(customer) 252, FormatStmnt(record) 253, and DisplayStmnt(statement) 254 make up the signature profile 250 representative of the View Statement process 204 (and trajectory 230). Typically, the sequence of the events 251-254 in the signature profile is important or unique, thus rendering two signatures distinct if they have the same traced events but in different sequential orders.

According to one embodiment, once a signature profile has been created, the systems and methods described herein insert, in one or more enterprise applications, tags (using software code injection, for example) corresponding to events associated with the signature profile. The systems and methods then monitor an additional usage scenario (operation) of the business processes (as represented by the one or more enterprise applications) and listen for one or more of the inserted tags. For example, when one of the process steps—for example, the View Statement process 204—is performed, the software instrumentation systems and methods described herein listen for software application instructions in the active signature profiles (i.e., in this case, the profiles for Validate Customer, View Statement, and Print Statement) and detect inserted tags corresponding to the process 204.

Optionally, the sequence of detected tags is matched against the active signature profiles and a determination is made that the additional operation is a View Statement operation. In one embodiment, the systems and methods described herein collect data at certain instructions (e.g., teller identity, customer balance, etc.). According to one practice, the collected data is reported to the user. In one embodiment, if a match is declared between the additional operation and one of the active signature profiles, information is reported to the user about the additional operation (e.g., identity of the customer whose account was viewed in the second operation).

The additional operation may include multiple executions of one or more of the process steps 202, 204, and 206, and these multiple executions may be distributed in time, occurring, for example, sequentially in time. If the teller performs a View Statement step multiple times (for one or more customers), then, in one embodiment, the systems and methods described herein detect tags associated with each execution of the View Statement operation and collect data associated with each execution of the View Statement process, including, the number of execution times, identities of the customers whose accounts were viewed, etc. This mode of monitoring is one way of detecting rogue behavior by tellers or others in a financial institution. Using the systems and methods described herein, the about 60-100 monthly fraudulent debit transactions that the commercial banker of the FBI report was performing can be discovered.

Figure 3:
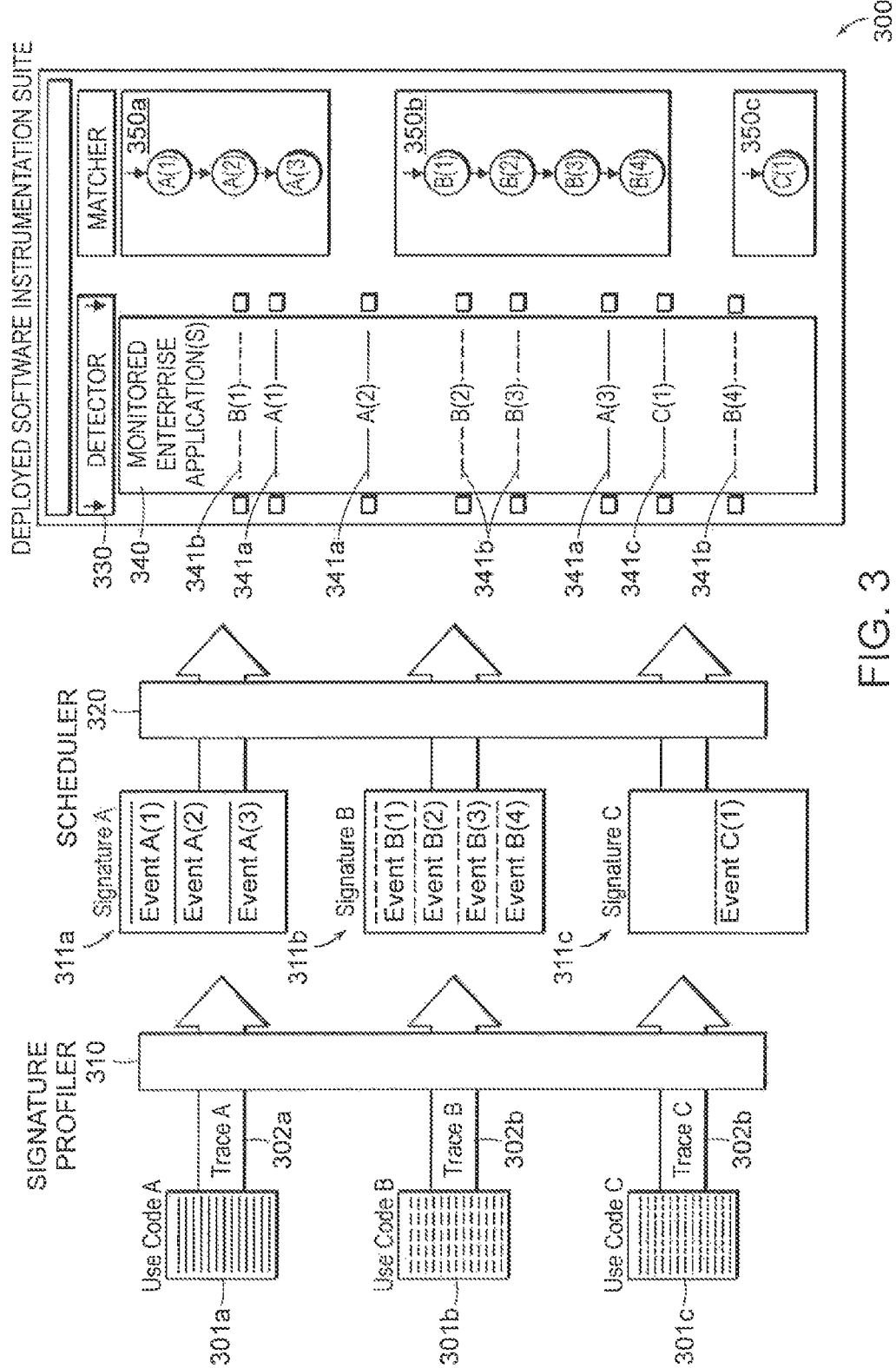
FIG. 3 depicts schematically an exemplary sequence of steps—according to an embodiment of the software instrumentation systems and methods—from the creation of a trace to matching a signature profile with a usage scenario.

FIG. 3 is a schematic diagram depicting an exemplary sequence of steps 300 from the creation of a trace, corresponding to a demonstrated usage scenario/operation, to matching a monitored usage scenario/operation with a profiled signature, in particular, the embodiment shown in FIG. 3 begins with a set of usage scenarios 301a-301c that are demonstrated by the systems and methods described herein, typically in a development phase. The software instrumentation suite creates traces 302a-302c, respectively corresponding to the usage scenarios 301a-301c. As mentioned previously, these traces include software application events that occur as part of the usage scenarios. A signature profiler/editor 310 creates signature profiles 311a-311c, respectively associated with traces 302a-302c. Each signature profile includes a subset of events belonging to a corresponding one of the traces 302a-302c.

Then, an optional scheduler 320 determines appropriate time frames for deploying the signature profiles 311a-311c to a detector 330 which monitors one or more enterprise software applications 340 tagged based on the signature profiles 311a-311c. The scheduler is controlled, in one embodiment, by a user who specifies the scheduled times or time windows. In some embodiments, the monitoring is to be continuously performed in time, in which case the scheduler 320 would not be employed.

In the embodiment shown in FIG. 3, the tags include the set of software runtime events 341a, corresponding to the signature profile 311a; the set 341b corresponding to the signature profile 311b; and the set 341c corresponding to the signature profile 311c. The matcher 350 then compares the tags detected by the detector 330 (when the monitored application 340 executes according to a yet-unidentified usage scenario) with a library of active signature profiles 350a (corresponding to the signature profile 311a), 350b (corresponding to the signature profile 311b), and 350c (corresponding to the signature profile 311c), and declares a match if a match with one of the active signature profiles 350a-350c is determined.

Figure 4:
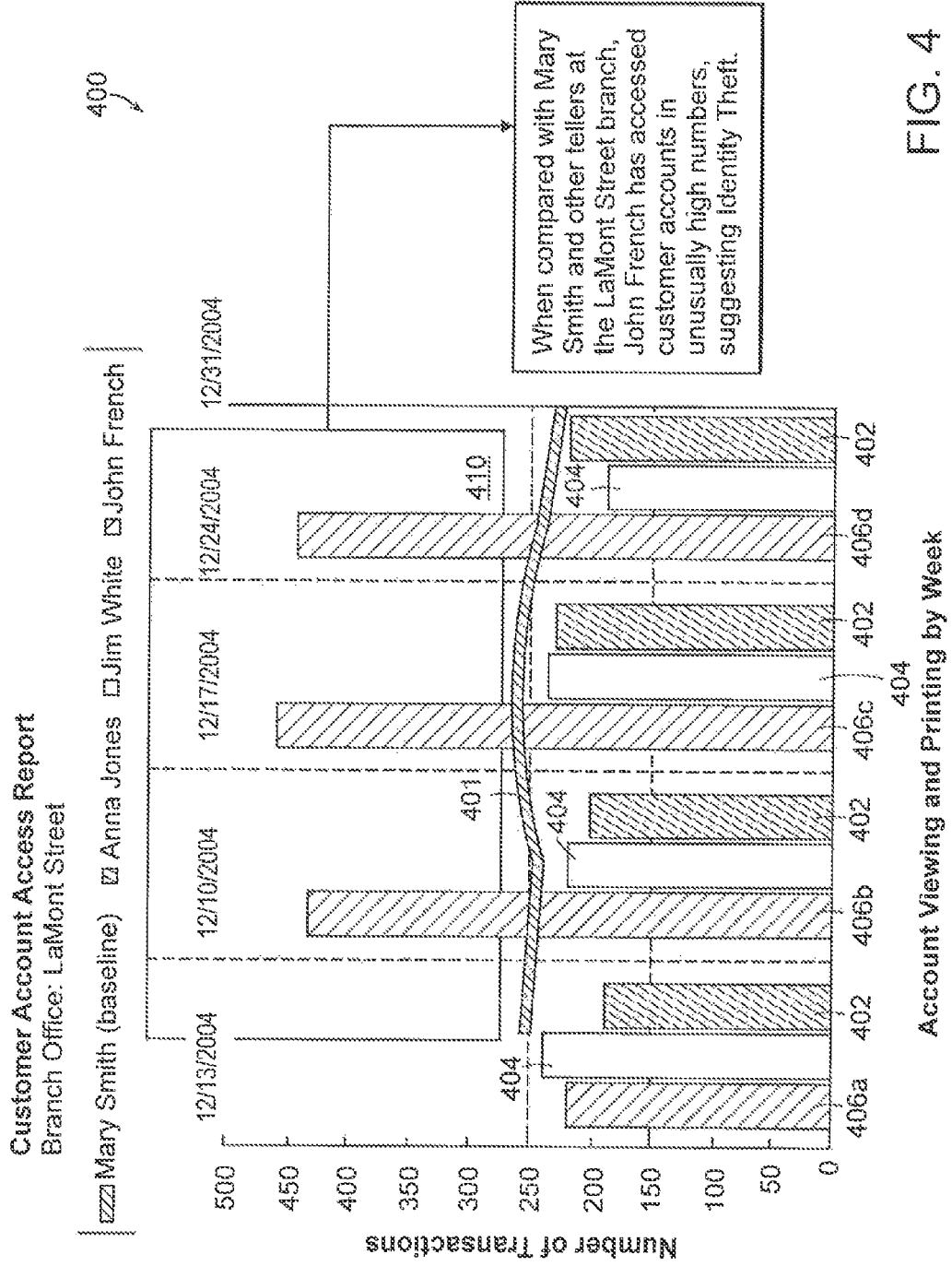
FIG. 4 depicts an exemplary report, generated by the software instrumentation systems and methods, about at least a subset of the steps in FIG. 2.

FIG. 4 depicts an exemplary report 400 generated by the systems and methods of the invention deployed to monitor teller activities corresponding to the risk hypotheses described in relation to FIG. 2. The figure shows account access (e.g., View Statement) by four tellers. Mary Smith is a model teller who is trusted by the bank and whose customer account management behavior is monitored for the duration of time represented by the plot 400 of FIG. 4. Her account access behavior is depicted by the curved line 401, considered to be a benchmark. Anna Jones, Jim White, and John French are three tellers whose customer account access activities are monitored at the dates shown in the figure, and are distilled in the histogram plots 402 (Anna), 404 (Jim), and 406a-406d (John), respectively.

As pointed out by the bracketed region 410 of the report 400, John's customer access behavior shown in 406b-406d are unusually high compared with the behaviors of Anna, Jim, and Mary. This may suggest fraudulent behavior by John. This is an exemplary illustration of how the report 400 generated by the systems and methods described herein assists business executives, IT staff, or other users to detect rogue or suspect behavior.

Figure 5A:
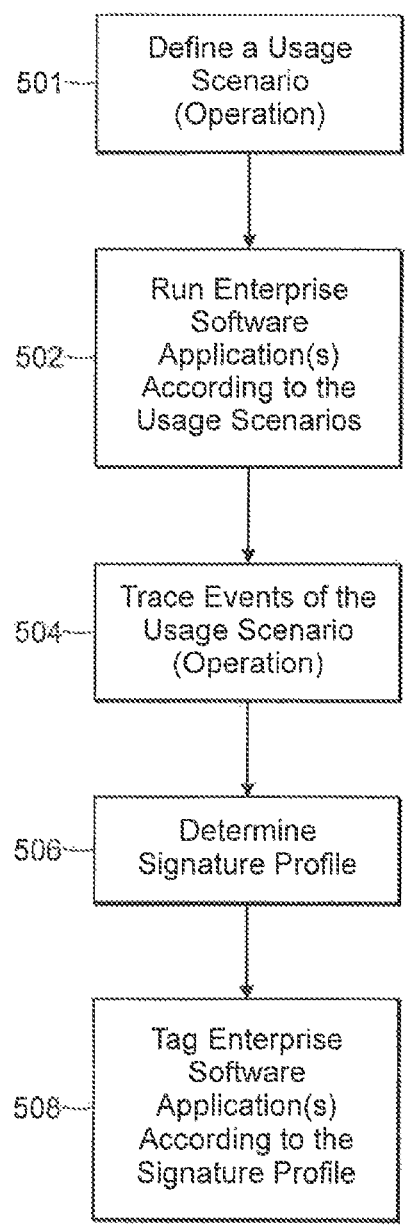
FIG. 5A-5B depict flowcharts representing various features of an embodiment of the software instrumentation methods.

FIG. 5A depicts, in the form of a flowchart, steps 500 of an embodiment of the software instrumentation methods described herein; the steps depicted by FIG. 5A are generally considered part of the development environment described below in relation to FIG. 13. According to one practice, the development environment steps 500 begin by defining or describing one or more usage scenarios (operations) in step 501. Typically, a usage scenario is defined or described by one or more business users (e.g., members of a corporate executive team) who devise business process goals that are important to the enterprise and which are to be examined. In step 502, the systems and methods described herein demonstrate the usage scenario (operation) by running (executing) the enterprise application(s) according to the defined usage scenario.

In step 504, the systems and methods described herein listen to the demonstrated usage scenario and compile a trace of various events that occur during the demonstration of the usage scenario. These traced events typically include one or more software runtime events, such as, without limitation, a method call, a method return, a line number of executing software, an object creation, a memory allocation or reallocation, a COM interface call, a COM interface return, a Java Bean event, a J2EE Bean event, a library load, a library unload, a file system event, a TCP/IP stack level transmit event, a TCP/IP stack level receipt event, an SQL event, a transactional bus event, an MQ series event, an MSMQ series event, a web service event, and a notification framework event.

In step 506, the systems and methods described herein filter the traced events to determine a signature profile. The signature profile is a subset of the traced events that are correlated with the demonstrated usage scenario. Typically, though not necessarily, the traced events are incorporated in the signature profile according to a specific sequence/order; that is, if the traced events A, B, C are incorporated in the signature profile, they acquire a particular order in the signature profile, such that signature A, B, C would be distinct from signature A, C, B, etc.

Although typically the signature profile includes a strict subset (i.e., a fraction) of the traced events, in some embodiments all the traced events are included in the signature profile to properly indicate or represent the demonstrated usage scenario.

Once the signature profile has been determined in step 506, the systems and methods described herein, in step 508, tag the enterprise software application(s) according to the signature profile. These tags correspond to the traced events belonging to the signature profile, that is, the events deemed correlated with, or representative or indicative of, the demonstrated usage scenario.

A purpose of inserting the software tags is to enable subsequent monitoring of a second operation a second usage scenario) of the enterprise application. According to one practice, inserting the tags includes injecting code blocks into the enterprise software application, wherein the injected code blocks correspond to one or more software application instructions executed as part of the demonstrated usage scenario (demonstrated, first operation) of the enterprise software application(s). In a typical embodiment, injecting the code blocks includes coupling to a software interface of the enterprise application. The software interface may include a runtime environment interface of one or more software languages underlying the construction of the enterprise application.

The systems and methods described herein employ, in various embodiments, published, secure, open application instrumentation interfaces at the application's language runtime layer. At least in part because of this approach, the software instrumentation systems and methods described herein do not have to depend on application-specific interfaces (e.g., a published API for the teller system), and can be used to instrument a broad range of enterprise applications rather than integrate with specific applications.

In some contexts, users do not wish for the software instrumentation systems and methods described herein to directly address events in mainframe code. Their wish stems at least in part from concerns about instrumenting the systems of record. Accordingly, in various embodiments, the systems and methods of the invention use interfaces and wrappers around mainframe applications to assess and monitor mainframe-based processes. In this way, conflict is avoided with security, integrity, and performance issues while still providing quality, speed, depth, and granularity of information about process execution.

Figure 5B:
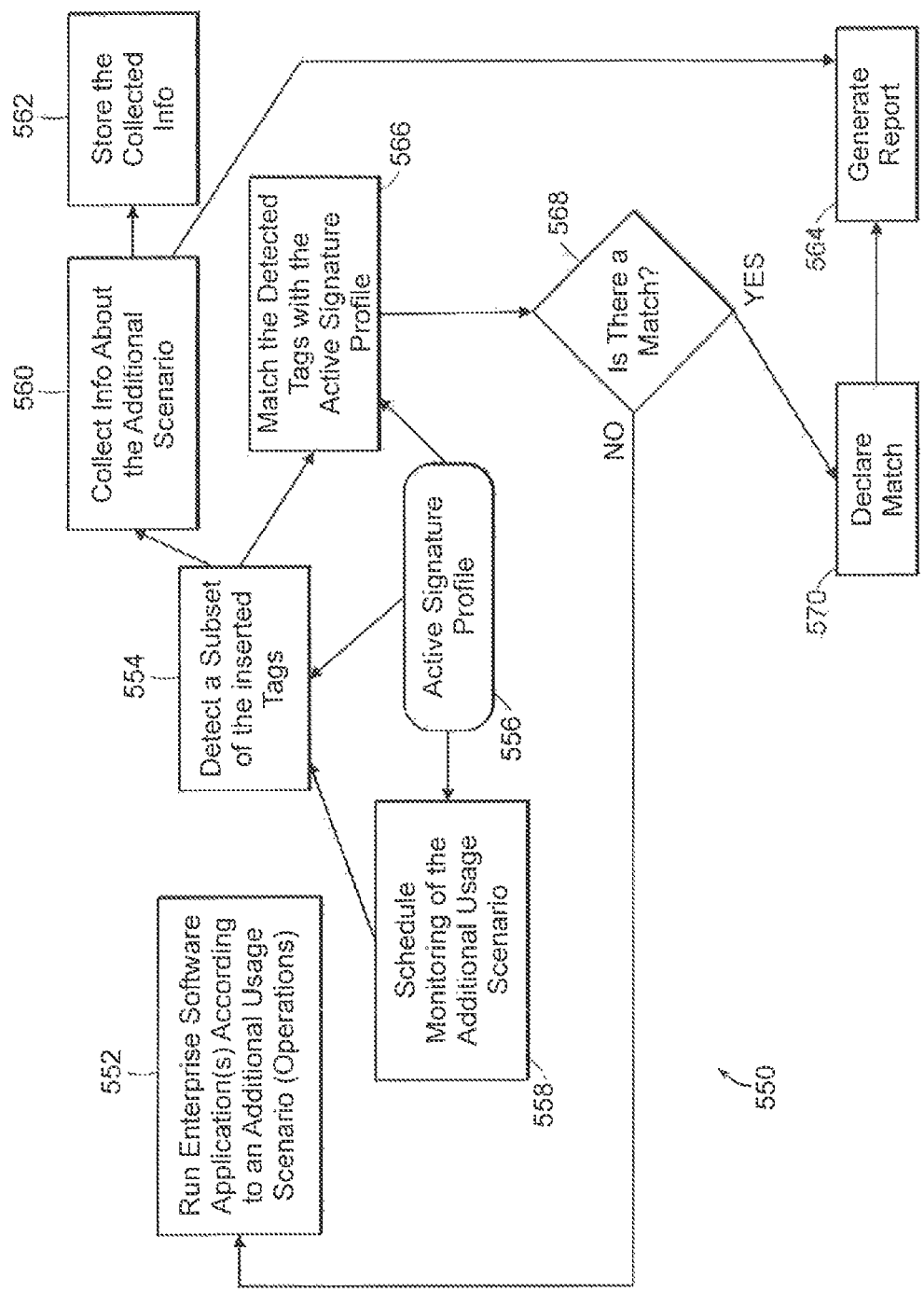

FIG. 5B shows steps 550 of an embodiment of the production environment of the software instrumentation systems and methods described herein. In particular, in step 552, the enterprise application executes according to an additional (e.g., a second) usage scenario (operation). The additional usage scenario may or may not be the same as the first, demonstrated usage scenario.

In one embodiment, the systems and methods of the invention detect, in step 554, one or more of the tags previously inserted in the enterprise application as part of step 508 of the development phase depicted by FIG. 5A. Optionally, the detection step 554 is influenced by a scheduling step 558, wherein one or more times or time windows (time frames) for monitoring the additional usage scenario are specified; in one embodiment, the monitoring is continuous, whereas in an alternative embodiment it is intermittent. The signature profile produced in step 506 of FIG. 5A is considered an active signature profile 556 in FIG. 5B if its constituent tags are being listened for in the detection step 554. In the embodiment wherein a scheduler determines, in step 558, the time frames for monitoring the additional usage scenario, a signature profile is considered active 556 if it is used by the systems and methods described herein as a reference signature profile during the scheduled detection time frames.

The production steps 550 include, in one embodiment, a step 560 for collecting information about the additional usage scenario. The collected information may be compiled according to a sequence in which the tags are detected in step 554 and may include information about the additional scenario at locations associated with the detected tags. Optionally, the information collected in step 560 is stored, in step 562, in a database or other computer-readable storage medium for subsequent referral. In one embodiment, the systems and methods described herein generate, in step 564, a report based on the collected information. The report can then be used by one or more users to evaluate risk, measure effectiveness of the enterprise software applications, revise the business processes underlying the enterprise applications, revise risk or value hypotheses, etc.

FIG. 5B also depicts an optional matching step 566 wherein the tags detected in step 554 are compared against the active signature profile 556 to determine whether a match exists. If, in step 568, a match is determined to exist, then the additional usage scenario of step 552 is said to be the same as the first, demonstrated usage scenario of step 502 in FIG. 5A. Following a match, a report is optionally generated in step 564. If a match is not discerned between the detected tags of step 554 and the active signature profile 556, then, optionally, yet another additional operation of the enterprise application is monitored, as depicted by link 552.

Although FIGS. 5A-5B have been described in terms of one enterprise application and one demonstrated usage scenario, it is understood that other embodiments of the systems and methods described herein exist that include two or more enterprise software applications executed according to one or more demonstrated usage scenarios. In such embodiments, one or more signature profiles are produced, corresponding to the one or more demonstrated usage scenarios; the signature profiles form a library of signature profiles, which then is considered an active library of signature profiles in 556 of FIG. 5B. It is against the active library of signature profiles that the detected tags from step 554 are compared to determine which, if any, of the demonstrated usage scenarios matches the detected tags.

Figure 6:
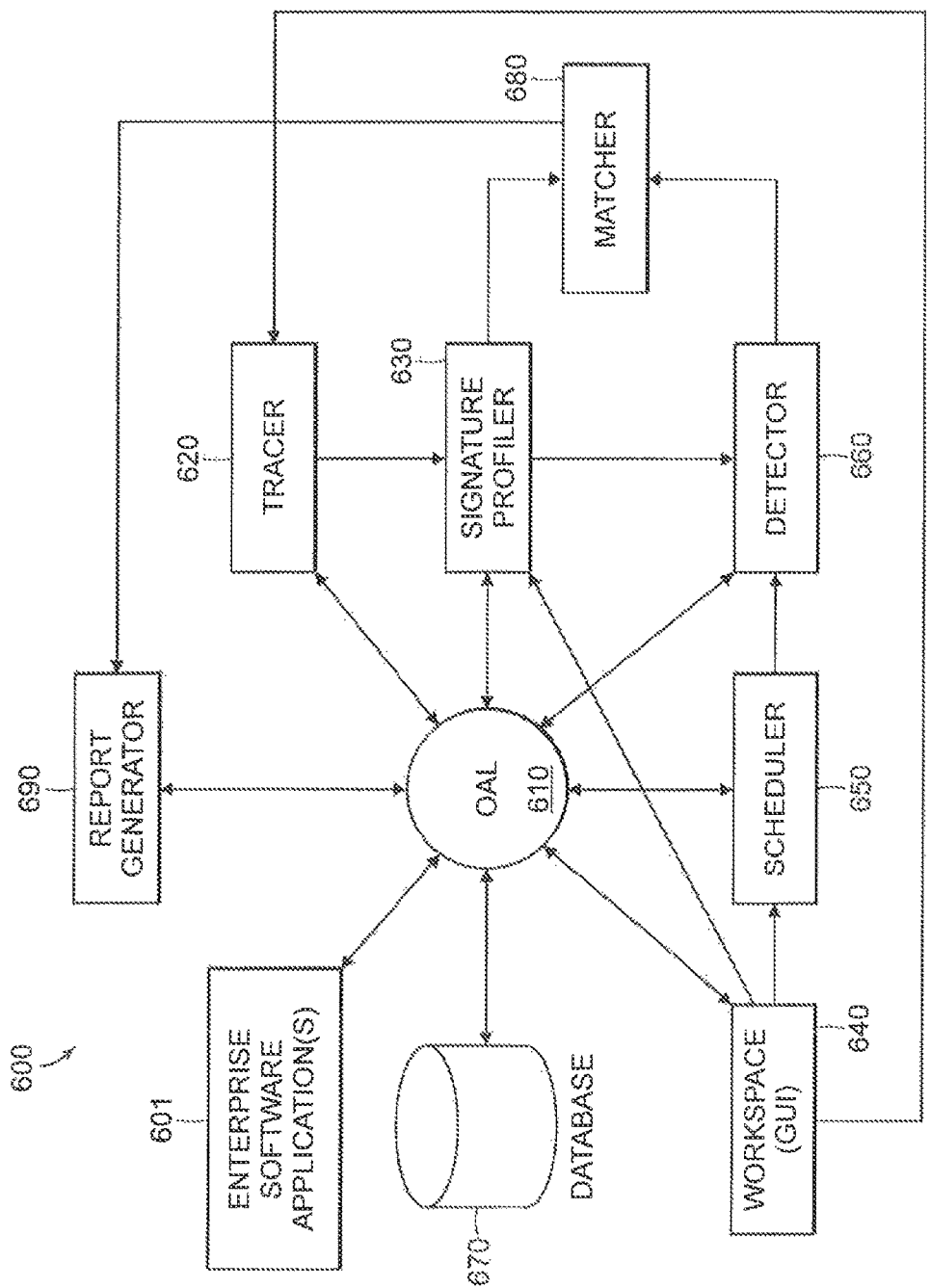
FIG. 6 depicts various components of an exemplary embodiment of the software instrumentation system architecture.

FIG. 6 depicts an exemplary architecture 600 of the software instrumentation systems and methods described herein. In particular, the embodiment shown in FIG. 6 includes an OAL application server 610 that acts as an information exchange hub for the various components of the software instrumentation system architecture 600. A tracer 620 traces software application events according to a demonstrated usage scenario (operation) of one or more enterprise software applications 601. According to one embodiment, the tracer 620 obtains a list of application instructions for processes of the enterprise applications 601 to be monitored. In a typical embodiment, the tracer 620 is deployed on the same development server as the enterprise applications 601. The tracer may interface with a custom or commercially-available packaged software application.

A signature profiler/editor 630 determines a signature profile representative of the usage scenario from the trace produced by the tracer 620. A scheduler 650 sets at least one time or time window (time frame) for a detector 660 to monitor an additional usage scenario/operation of the enterprise software application 601. The times or time windows set by the scheduler 650 may be determined by a user operating the system 600 using a project workspace (that can include a GUI) 640. In a typical embodiment, the detector 660 monitors instructions in the additional operation of the software applications 601 corresponding to an active signature profile (i.e., a signature profile against which the additional usage scenario is to be compared, during the time frame specified by the scheduler 650). Like the tracer, the detector 660 may interface with a custom or commercially-available packaged enterprise application 601.

A matcher 680 compares the tags detected by the detector 660 with a library of one or more active signature profiles. If a match is detected, the matcher 680 optionally generates a report 690 containing information about the additional usage scenario. In one embodiment, the report contains information about the enterprise applications 601 at one or more locations associated with the detected tags. In a typical embodiment, a sequence in which the tags are detected is significant, and is used in the matching process; that is, if two detected sequences contain the same events but in different orders, the two sequences are considered different.

A database 670, which is in communication with the OAL 610 to exchange information, serves as a repository of project information, including trace, signature, scheduling, match, and reporting data, among others things. In one embodiment, the project workspace 640 (that may include a GUI or another user interface), serves as a command and control center for the user, or team of users, to manage various aspects of the system architecture 600 and the functioning thereof. In one embodiment, the project workspace is used as a primary user interface used by a project team to define projects, describe/define business processes represented by enterprise software applications, demonstrate usage scenarios, and manage signatures, reports, and alerts, among other things.

Figure 7:
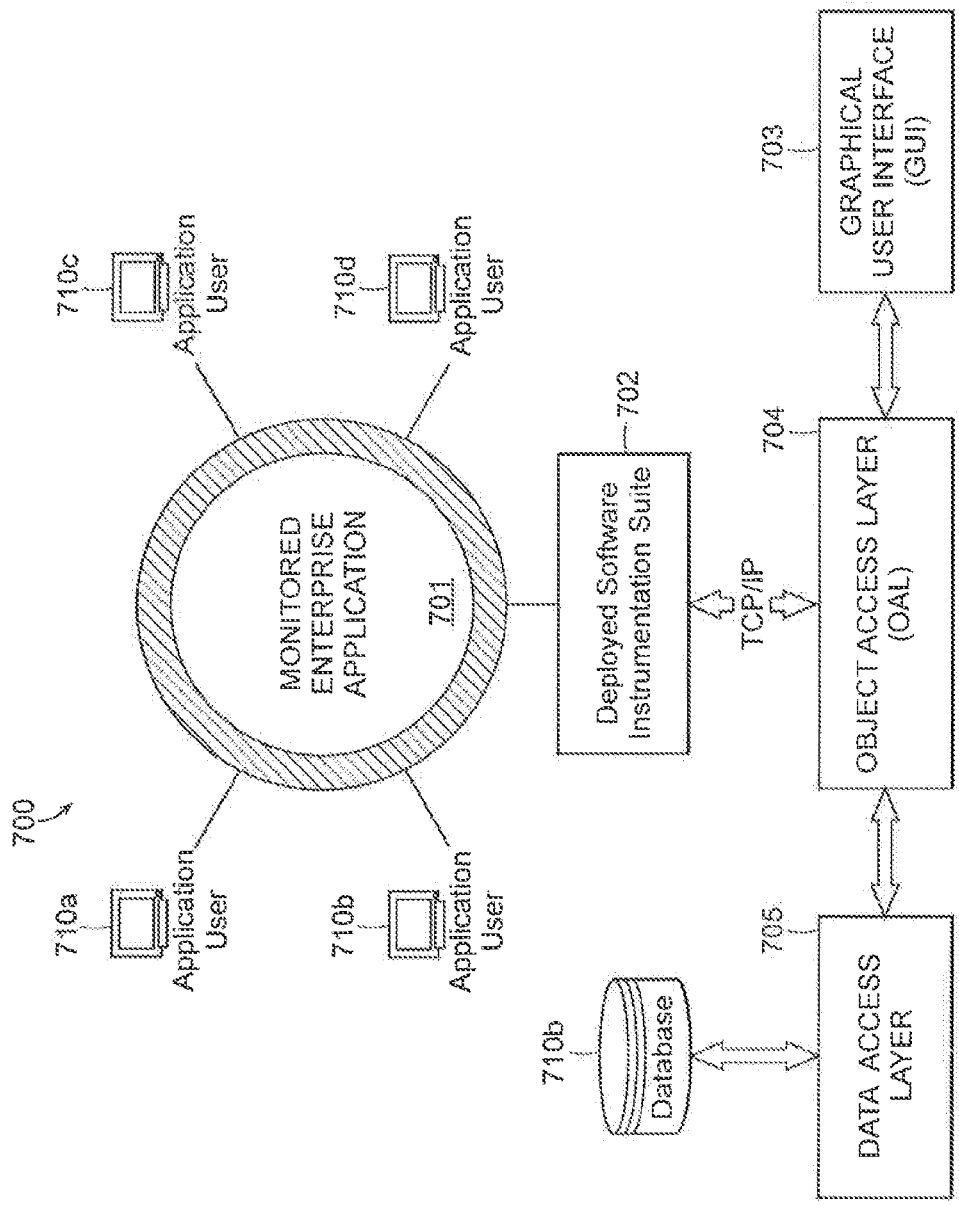
FIG. 7 depicts an exemplary deployment of the software instrumentation systems and methods.

FIG. 7 depicts yet another embodiment of a deployment configuration 700 of the software instrumentation systems and methods described herein. In particular, the software instrumentation suite 702 is deployed—typically as a transparent layer—around one or more enterprise software applications 701. The deployment of the software instrumentation suite 702 generally, involves little, if any, downtime for the enterprise applications 701. Overhead (if any exists) associated with the deployment and implementation of the software instrumentation suite 702 is typically not detectable by application users 710a-710d who communicate with the enterprise applications 701 via TCP/IP or other communication protocols, which may include wireless protocols.

Also shown in FIG. 7 are components 703-706 associated with the software instrumentation systems and methods 702. Typically, these components form a geographically (physically) distributed network and communicate with each other, and with the suite 702, via TCP/IP or other communication network protocols, possibly including one or more wireless protocols. The distributed components, according to one embodiment, include, for example, an object access layer (OAL) 704, described above in relation to FIG. 6. According to one practice, the OAL 704 serves as an application server that communicates with, and controls, other components of the instrumentation suite 702, such as, without limitation, a graphical user interface (GUI) 703 for controlling the software instrumentation suite 702 and a data access layer 705, which, according to one embodiment, serves as a conduit for the suite 702 to access a database 706. According to one practice, the database 706 serves as a repository of information such as, without limitation, traced event data, signature profile data, data associated with one or more matches between monitored usage scenarios (operations) of the software applications 701 and profiled scenarios (i.e., scenarios associated with the signature profiles in the repository 706), monitoring schedules, etc.

To further illustrate various features and embodiments of the software instrumentation systems and methods described herein, another example will now be described, related to another area of risk to a financial institution. One form of fraud in the banking industry is escheat fraud, wherein bank employees identify dormant accounts, process unauthorized address changes, and make fraudulent fund transfers. In various embodiments, the systems and methods described herein enable banking authorities to identify unauthorized account activities, the fraudsters involved, the monetary amounts of the fraudulent transactions, and the accounts affected, among other things.

Figure 8:
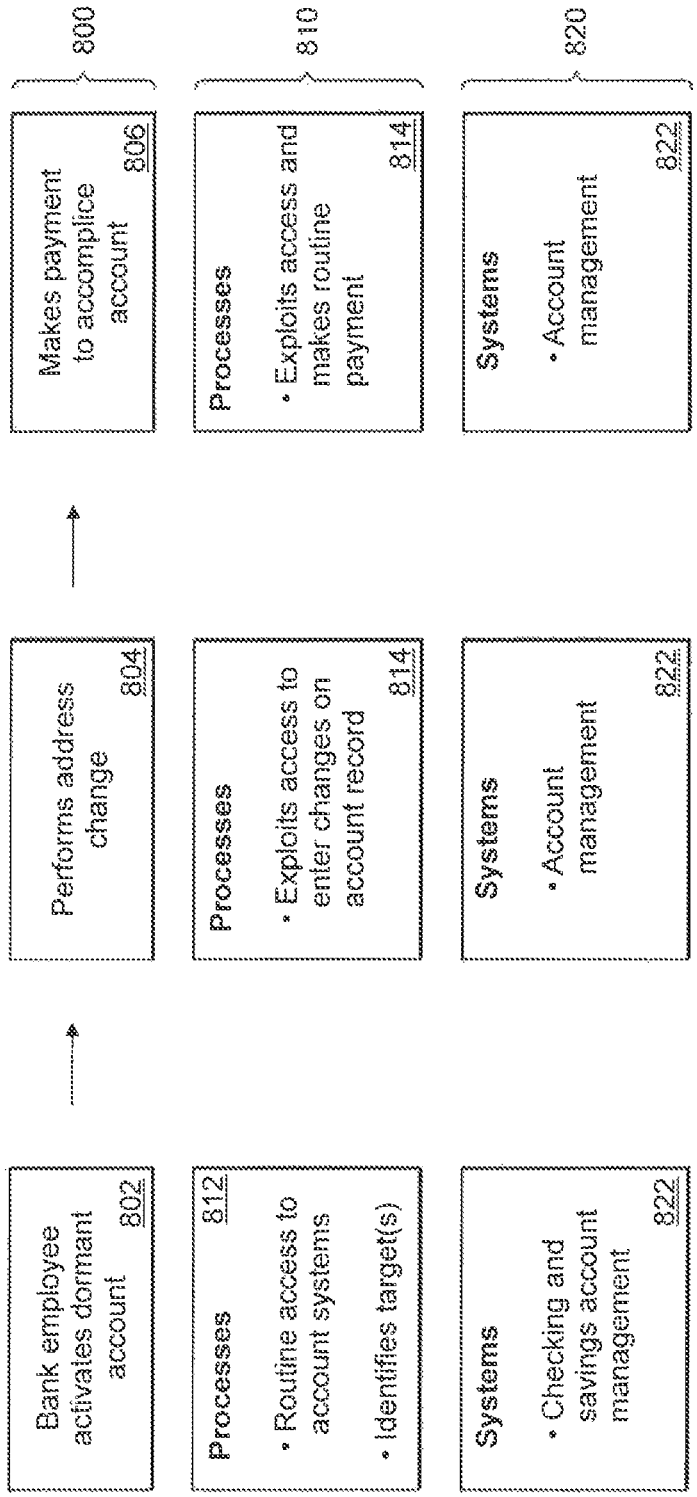
FIG. 8 depicts schematically an exemplary usage scenario for bank account escheat fraud.

FIG. 8 depicts an exemplary process 800 followed by escheat fraudsters, exemplary software application processes 810 associated with the various steps of the process 800, and exemplary software application modules/systems 820 associated with the various steps of the process 800. In the particular embodiment depicted by FIG. 8, the bank employee, in step 802, accesses a dormant account. Then in step 804, the employee effects an address change. Subsequently, in step 806, the employee makes an unauthorized payment to an accomplice account from the dormant account.

In the embodiment depicted in FIG. 8, the step 802 includes processes 812 that include routine access to account systems and identifying target dormant accounts. An enterprise software application associated with the activities of step 802 is the bank's checking and savings account management system.

The Change Address step 804 involves the software process 814 of accessing the dormant account to alter one or more features of the account, for example, an address associated with the account. An enterprise software application associated with the activities of step 804 is the bank's account management system 822.

According to the embodiment depicted by FIG. 8, the Make Payment step 806 includes the software process 814 of accessing to the dormant account to make a seemingly routine payment from the dormant account to another account serving as the accomplice account. An enterprise software application associated with the activities of step 806 is the bank's account management system 822.

FIG. 9A-9F depict, in the form of a graphical user interface (GUI), computer screenshots that illustrate features and steps of the software instrumentation systems and methods of the invention employed to detect the escheat fraud described in FIG. 8.

Figure 9A:
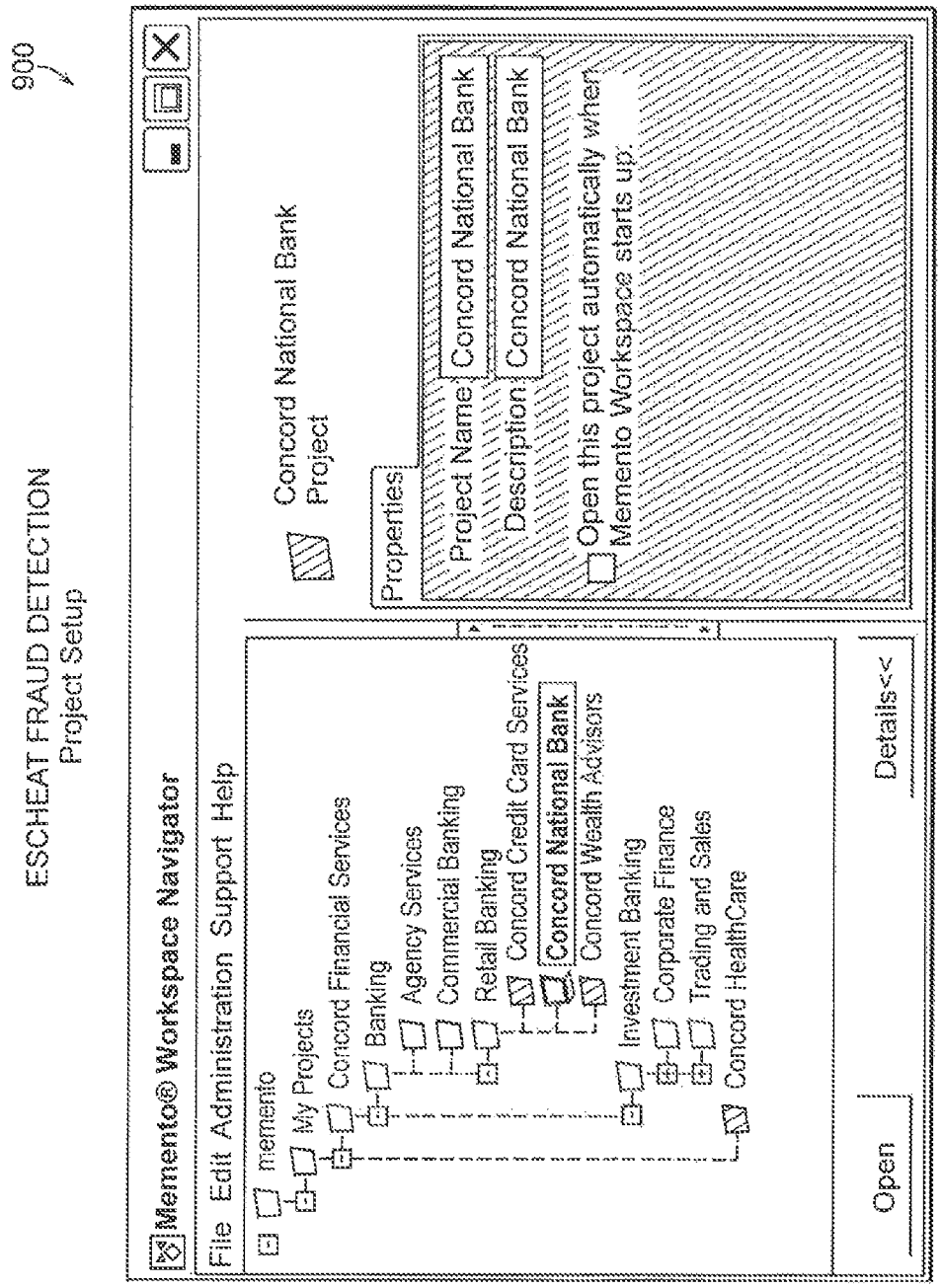

Exemplary screenshot 900 of FIG. 9A depicts a GUI for defining the escheat detection project. Here, the bank whose teller's activities are to be monitored is specified.

Figure 9B:
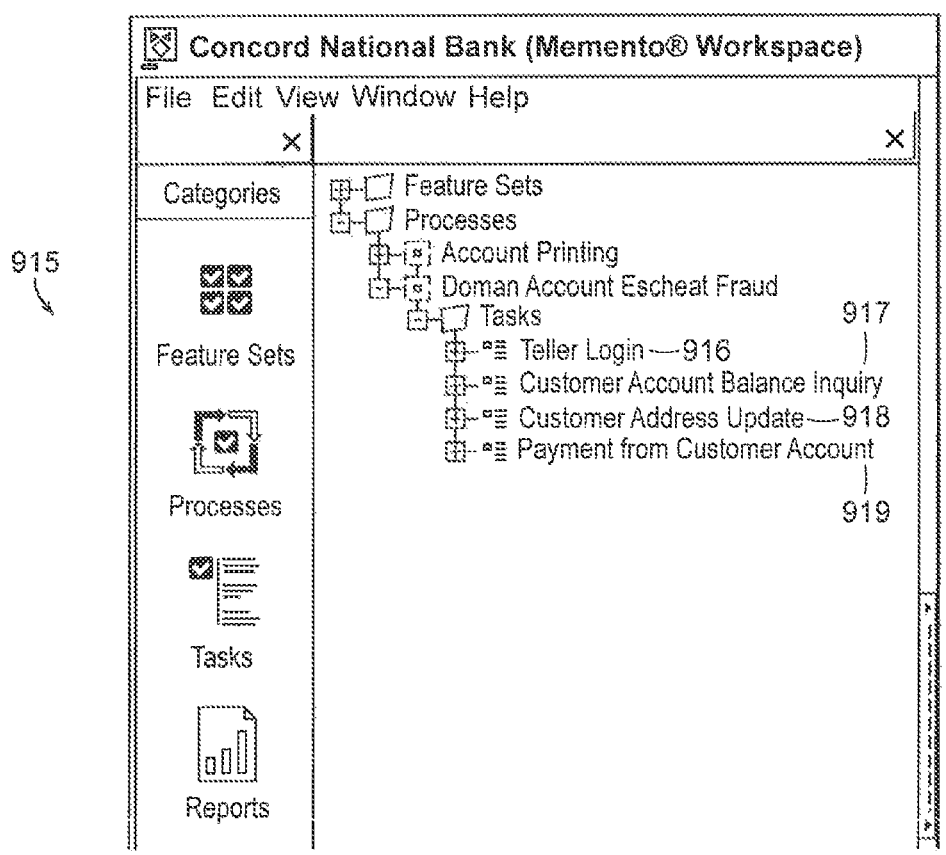

Exemplary screenshot 915 of FIG. 9B depicts a GUI for defining the processes that are deemed (according to the established fraud hypotheses) to be indicative of escheat fraud. In the depicted embodiment, these processes 916-919 include Teller Login, customer account Balance Inquiry, customer Address Update (also referred to as Address Change), and Make Payment from customer account.

Exemplary screenshot 930 of FIG. 9C depicts a GUI for setting up a signature profile for the process step 917 of FIG. 9B: account Balance Inquiry. In this embodiment, the event designated to represent the process step 917 is the application instruction BankTransactions.AccountTransaction.Balance( ) 932. The screenshot 930 also depicts event parameters 935 associated with the application instruction 932 of the signature profile 931. The parameters 935 contain information that is collected in various embodiments of the systems and methods described herein, e.g., Teller ID, Customer ID, Account No., Balance amount, Last Transaction.

FIG. 9D depicts an exemplary Account Lookup screenshot 945 provided by the GUI of the systems and methods described herein. In particular, the screenshot 945 shows a Customer Master List 946 of the bank.

Turning to FIG. 9E, an exemplary screenshot 960 is shown for Address Change. The teller uses this GUI screen to change the address 962 and/or telephone information 963 associated with a particular customer 961 who has one or more dormant bank accounts 965. Using the button 964, the fraudster teller then saves that change in the records associated with the dormant account(s) of the customer.

Turning now to FIG. 9F, an exemplary screenshot 975 is shown for making a payment 981, typically in a small amount 976, from the dormant account 977 to an accomplice 980. The accomplice 980 is typically either the teller or an associate of the teller.

Figure 10A:
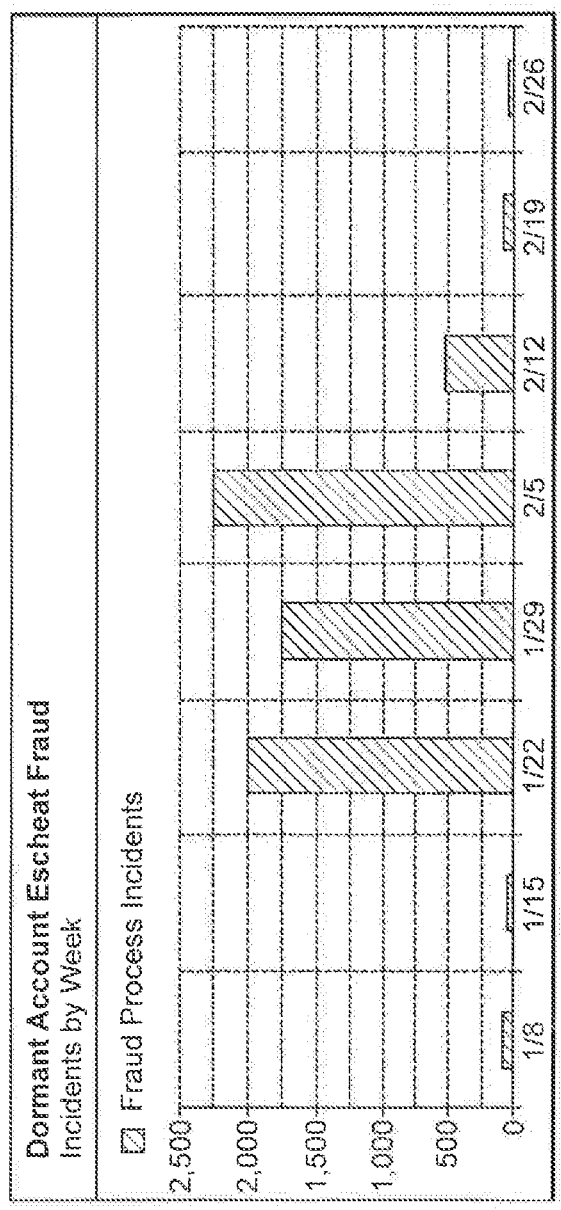
Figure 10B:
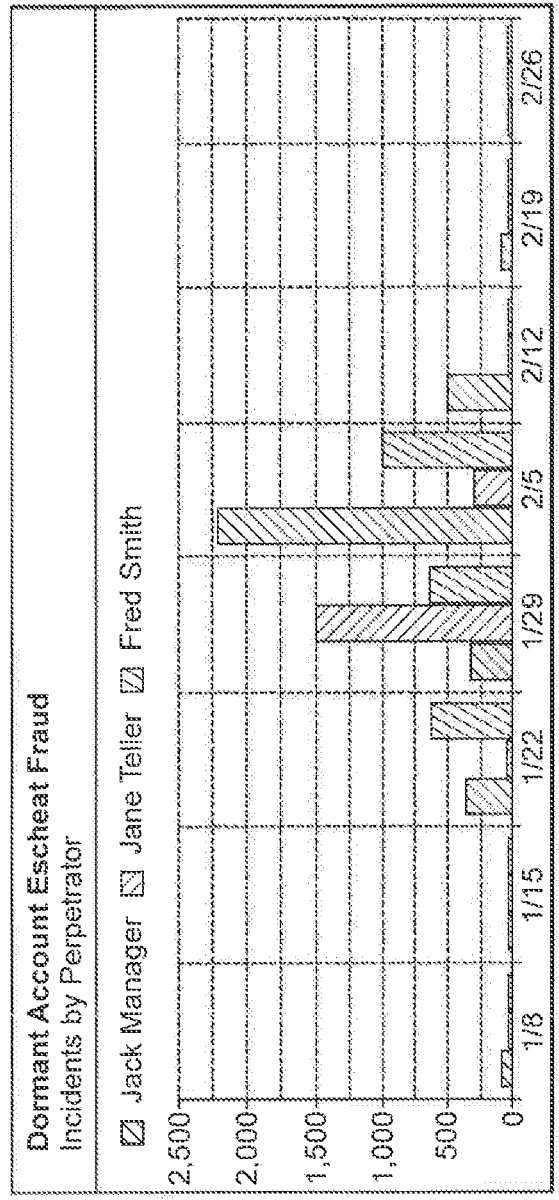

FIG. 10A-10C depict exemplary reports generated by the software instrumentation systems and methods described herein for detecting the escheat fraud described in relation to FIG. 8 and FIGS. 9A-9F. Information collected by the systems and methods of the invention in monitoring business processes are distilled or collated into the various charts shown in FIGS. 10A-10C.

In particular, FIG. 10A depicts a histogram chart 1000 showing the number, by week, of incidents indicative of escheat fraud, FIG. 10B depicts a histogram chart 1020 indicating, by perpetrator, activities indicative of escheat fraud. FIG. 10C depicts, in tabular form 1040, an exemplary report containing customers 1041 affected by activity indicative of escheat fraud, corresponding amounts transferred 1042 from their accounts, last account access dates 1043, and identities of tellers 1044 who manipulated the customers' accounts. Other embodiments exist in which other account, access, and activity information is disclosed in the report.

The systems and methods described herein produce reports according to the granularity of detail specified by the users. Business executives and other users can use the exemplary reports of FIGS. 10A-10C to assess and quantify risk, implement appropriate controls, monitor effectiveness of controls, monitor key risk indicators, and even revise risk hypotheses which would then cause a reconfiguration of the systems and methods described herein to implement revised monitoring and control procedures and infrastructure in compliance to the revised risk hypotheses. Such revisions and reconfigurations are straightforward because of the ease with which the software instrumentation systems and methods described herein can be reconfigured and deployed.

Figure 11:
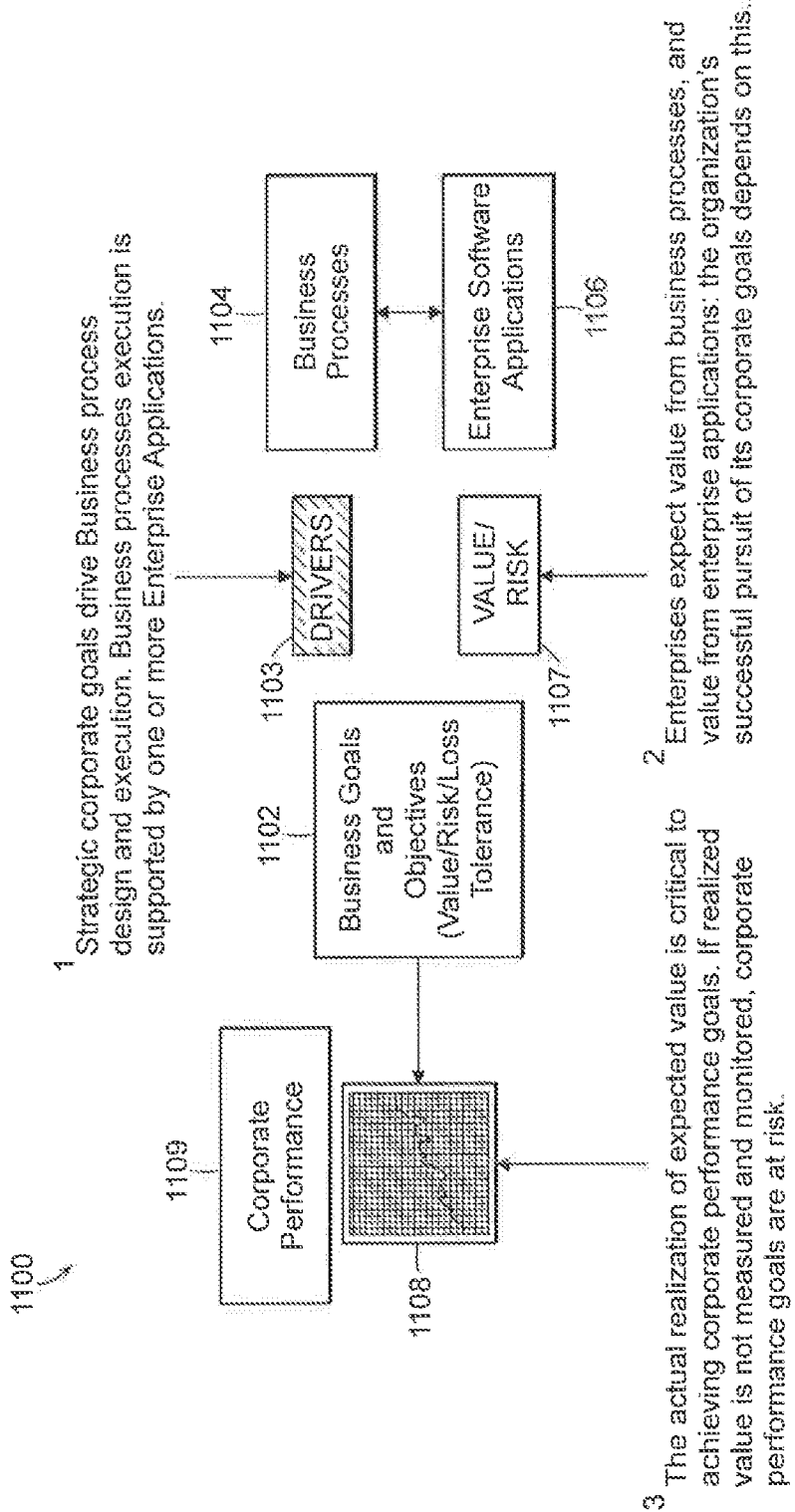
FIG. 11 depicts an application of the software instrumentation systems and methods directed to enhancing realization likelihood and evaluation of business process goals and objectives.
Figure 12A:
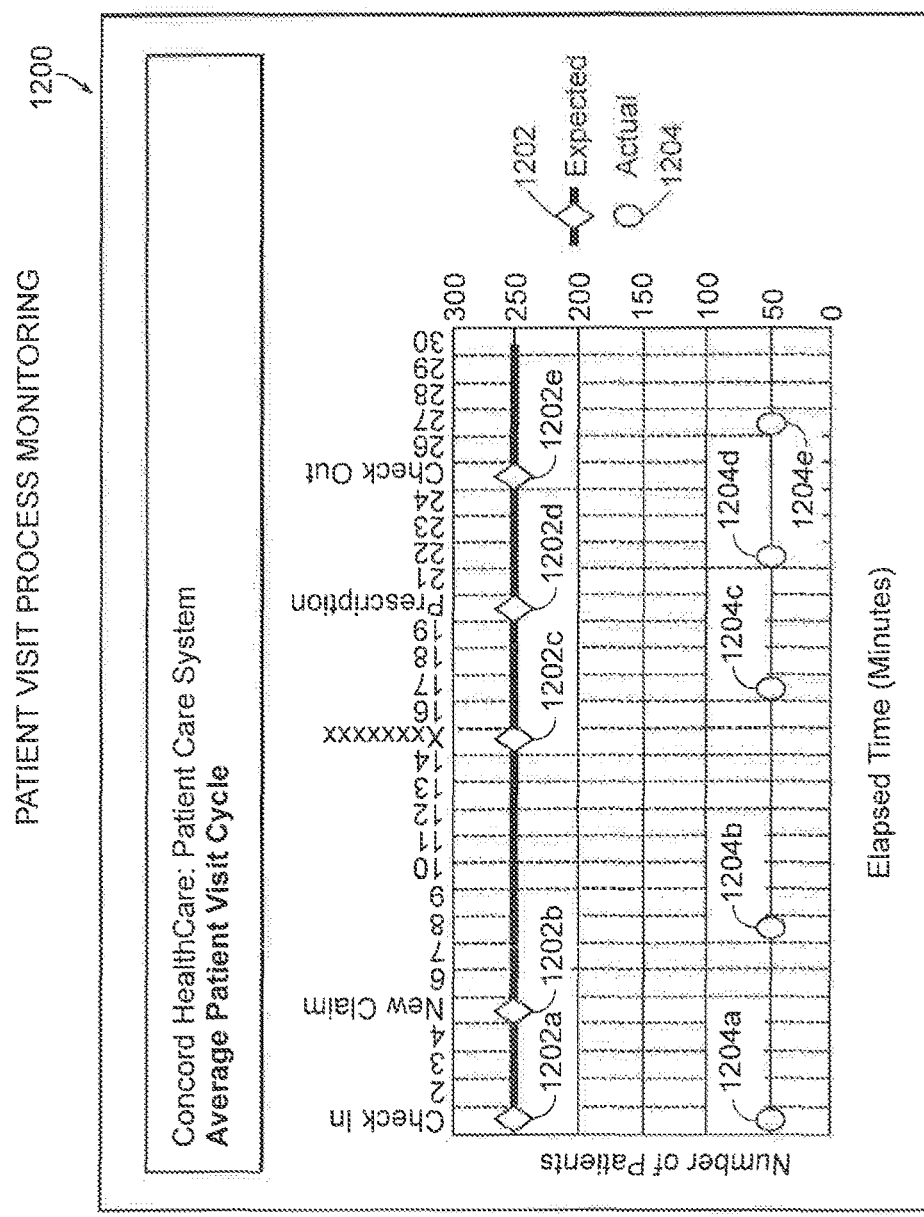
FIG. 12A-12C depict exemplary reports produced by an embodiment of the instrumentation systems and methods that monitor an enterprise software suite implementing a healthcare network's patient management system.
Figure 12B:
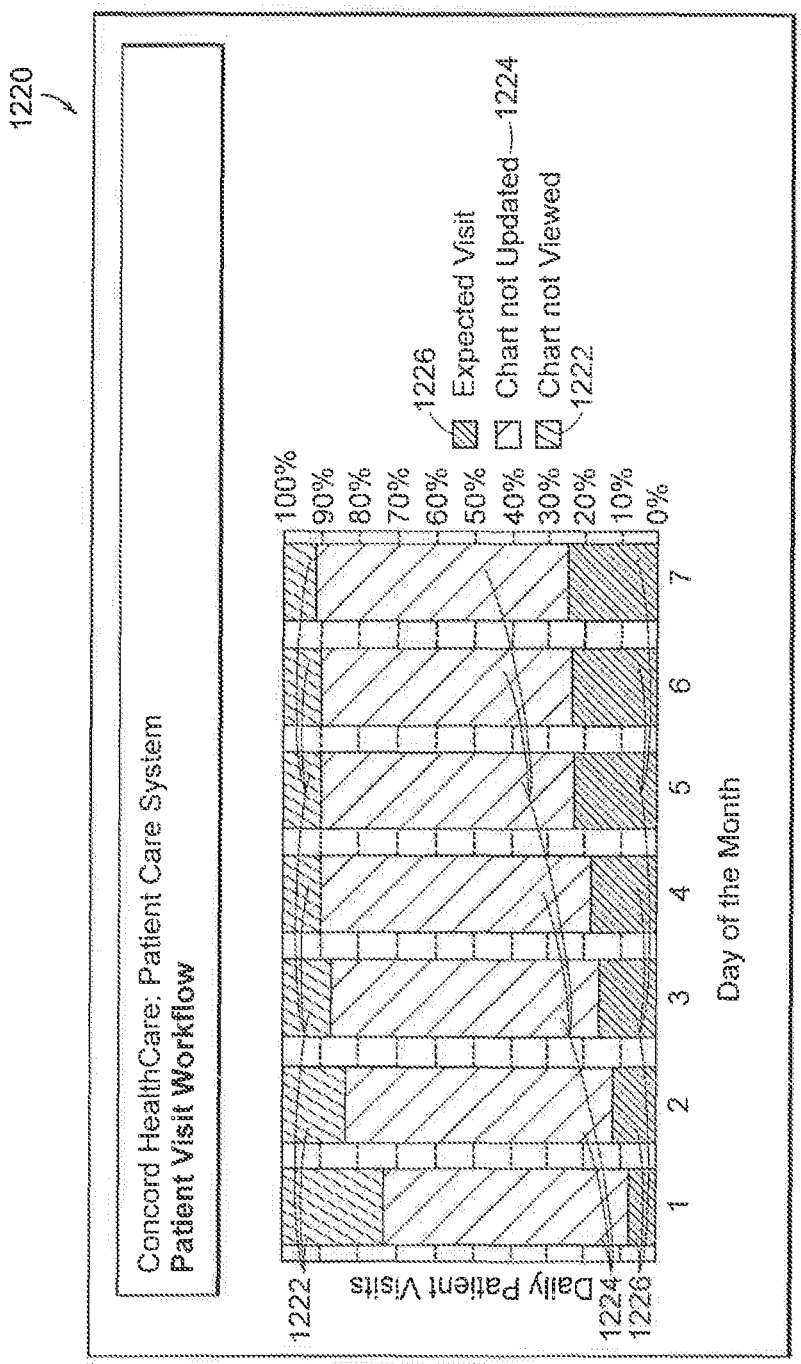

The embodiments described so far have focused on risk management utility of the software instrumentation systems and methods of the invention. FIG. 11 and FIGS. 12A-12B illustrate another advantageous aspect of the systems and methods of the invention, namely, assessment of value from enterprise applications.

FIG. 11 depicts an application 1100 of the software instrumentation systems and methods described herein, directed to enhancing a likelihood of realizing an enterprise's business goals and objectives 1102, and to measuring 1108 the enterprise's performance 1109 to determine how closely the enterprise meets those goals and objectives 1102. In various embodiments, the goals and objectives 1102 include metrics denoting tolerance for, exposure to, or protection and robustness against, risk or loss.

Prompted by a need to adapt to, or even lead, a dynamically-changing business climate, a management team of the business enterprise from time to time adjusts its strategic goals and objectives 1102. To meet the goals and objectives 1102 in the changing business environment, corporate executives design, reengineer, or otherwise drive, as shown by block 1103, business processes 1104 which are deemed conducive to meeting the enterprise's goals and objectives 1102.

As described above, business processes 1104 are supported, modeled, or otherwise represented at least in part by one or more enterprise software applications 1106, which execute to implement one or more aspects of the processes 1104. The enterprise executives typically depend on an efficient execution of the software applications 1106, limited exposure of the software applications to risk or loss, and robustness of the business processes 1104 against risk or loss, in achieving their business goals 1102. To increase process efficiency, enterprise management executives typically employ a chief information officer (CIO) and an information technology (IT) team to develop enterprise software applications 1106 to implement the business processes 1104. In various embodiments, the software applications 1106 include custom applications (e.g., an Insurance Claims Processing System) or customizations of commercially-available packaged applications (e.g., Siebel Customer Relationship Management (CRM)) that automate the business processes 1104 and support process execution.

The business enterprise also expects value 1107 from the business processes 1104 implemented at least partially by the enterprise software applications 1106. Accordingly, the enterprise assesses value 1107 from the software applications 1106 and their underlying business processes 1104—aided in part by measuring 1108 the corporate performance 1109—and revising the goals and objectives 1102 as appropriate.

An example of value assessment and process effectiveness monitoring is illustrated by the sample reports generated by the systems and methods described herein, which were installed for a healthcare network. The healthcare network includes several stand-alone hospitals working in concert.

Figure 12C:
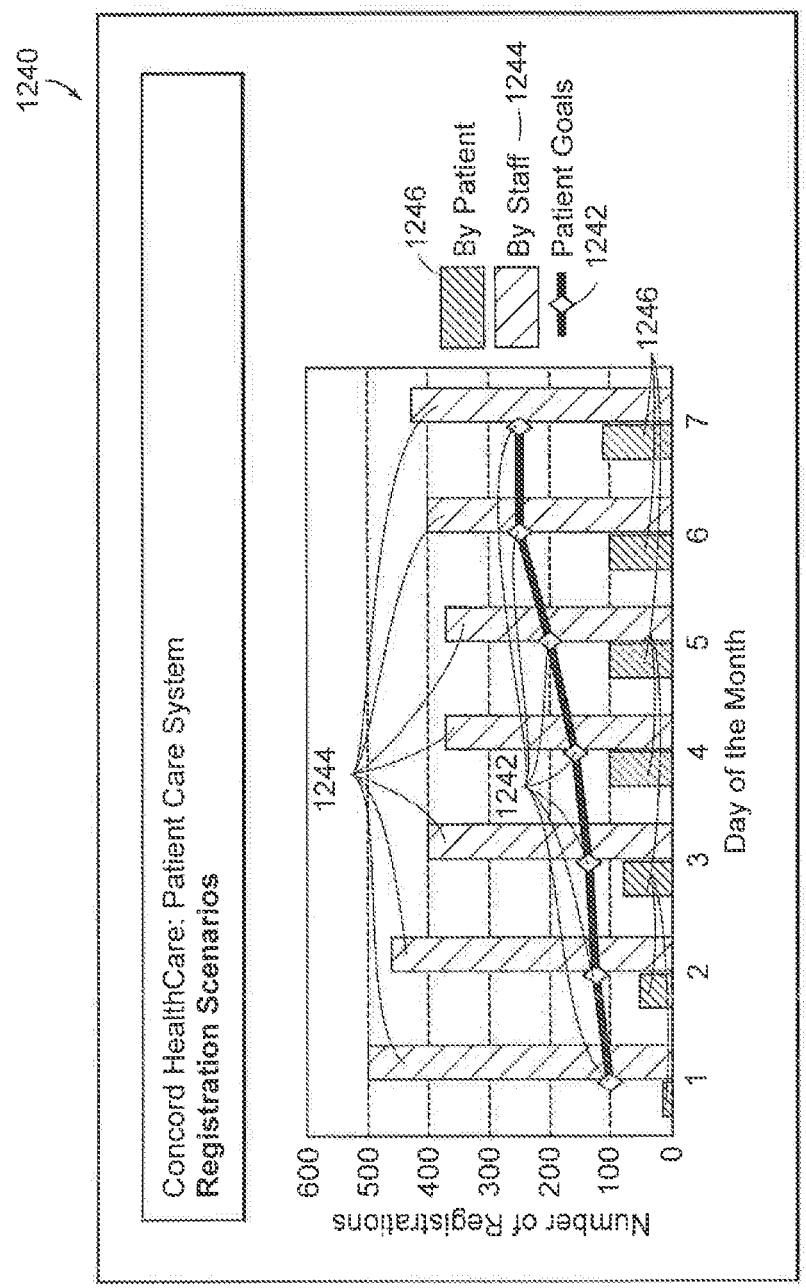

FIGS. 12A-12C respectively depict exemplary reports 1200, 1220, and 1240 generated by the systems and methods described herein to enable management of the healthcare network to assess, quantitatively and concretely, how well implemented business processes meet the network's expectations and goals. According to one practice, the business goals and objectives for this healthcare organization broadly include increasing staff productivity and reducing costs without adversely affecting quality of patient care. To meet these goals, the healthcare organization implements a Patient Visit Process—a sequence of steps that includes checking in a patient, rendering medical services to the patient, and checking out the patient—across the healthcare network, a process that is at least partially supported, implemented, or automated by a Patient Care System which includes—a suite of one or more enterprise software applications.

According to one embodiment, the Patient Visit Process includes the following steps: check in a patient; view the patient's medical chart; medically examine the patient; update the patient's chart; optionally, prescribe a drug treatment regimen to the patient; and check the patient out. In addition to improving overall staff productivity, following the steps of the Patient Visit Process—which employ the Patient Care System and the Electronic Patient Record that it generates—is expected to improve overall quality of patient care. An additional, or alternative, expectation is that on average, across the entire patient population, this process will be completed in about 25 minutes for each patient.

In one aspect, the expected value from the Patient Visit Process, and the Patient Care System that implements the Patient Visit Process, includes a drop in total Patient Cycle Time. According to one exemplary embodiment, the drop is from an average of about 55 minutes to about 25 minutes—a significant productivity increase. Additionally, or alternatively, the Patient Care System is expected to enable a significant portion of all patients (e.g., about 30%, according to one embodiment) to self-register: a reduction in patient registration staff of close to one-third. In yet another aspect, an Electronic Patient Record produced by the Patient Care System is expected to reduce, or in some instances eliminate, incidences of adverse interactions of prescription drugs—a significant improvement in the quality of patient care.

Turning to FIG. 12A, a set of results 1200 based on monitoring, in real time, the expected performance 1202 and actual performance 1204 of the Patient Visit Process is depicted. Expected results are shown by solid rhombuses depicting the various steps in the Patient Visit Process: 1202a (patient check-in), 1202b (view the patient's chart), 1202c (examine the patient and update the chart), 1202d (prescribe medication), and 1202e (patient check-out). Actual data is shown by solid circular dots 1204a-1204e, respectively corresponding to the steps associated with the expected results 1202a-1202e.

As FIG. 12A shows, the actual process 1204a-1204e averages a cycle time of about 27 minutes, reasonably close to the expected 25 minutes. Therefore, taking a primary view of the total Patient Visit Cycle Time, the data 1200 appears to indicate that the Patient Visit Process has been successfully implemented by the adopted Patient Care System. However, as indicated by the data on the vertical axes, the number of patients for whom the Patient Visit Cycle was completed in time—about 50—is a small fraction (about 20%) of the expected about 250 patients for whom the Patient Visit Cycle Time is expected to be about 25 minutes. It is evident that the healthcare organization does not see the expected staff productivity increases or the patient care benefits with this adoption rate.

FIG. 12B shows the actual process 1220 that the healthcare network's staff follows for the remaining 80% of the patient population. For a number of the patients, the electronic patient record is not viewed 1222 prior to treatment. For a vast majority of the patients, the patient record is not updated 1224. Such process breakdowns adversely impact the quality of patient care.

In addition to monitoring the entire Patient Visit Process, the healthcare network also expects that the new Patient Self-Registration features of the Patient Care System are used and adopted as expected, so as to realize desired cost-reduction goals.

Turning to FIG. 12C, expected patient self-registrations are depicted by solid rhombuses 1242; registrations by the healthcare network staff are depicted by columns 1244; and patient self-registration data is depicted by columns 1246. The data indicates that the healthcare network falls well behind its expectations for patient self-registrations, with little or no respite for hospital registration staff.

Employing the systems and methods of the invention for instrumenting software applications enables the healthcare network to, among other things, evaluate a business process and a software application used to implement the business process. Additionally, the systems and methods described herein enable the healthcare network to use the collected data to manage and adjust its strategic goals—in this case including a combination of redesigning the Patient Visit Process; redesigning the Patient Care system (software application); retraining the staff; and providing the staff and the patients with incentives to encourage adoption of the redesigned Patient Care System.

Figure 13:
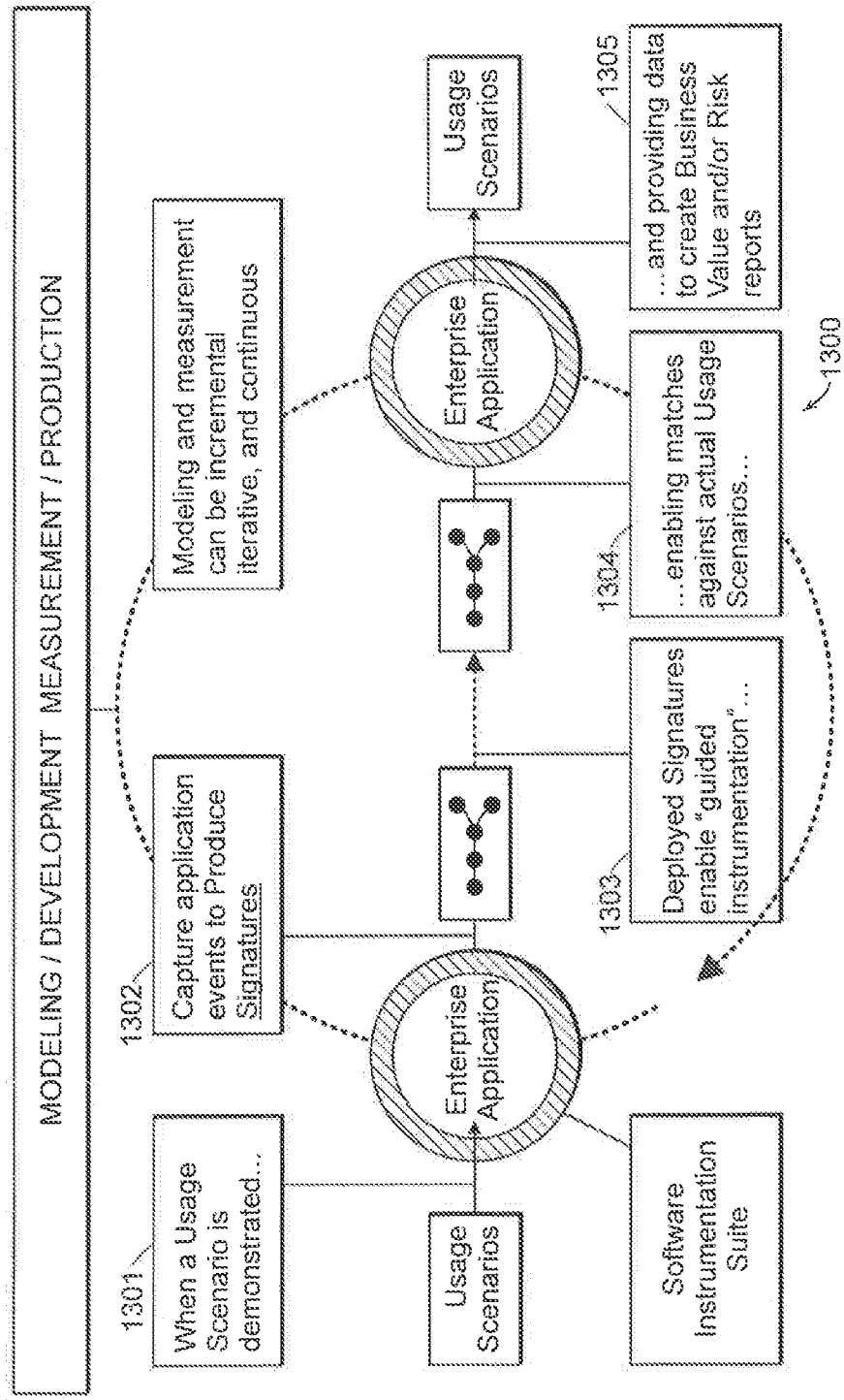
FIG. 13 depicts a schematic diagram of a platform for modeling application usage scenarios according to an embodiment of the software instrumentation systems and methods.

FIG. 13 shows a high-level schematic diagram of a development and production environment lifecycle 1300 according an embodiment of the software instrumentation systems and methods described herein. In step 1301, following installation of the software platform of the invention, the software platform employs a module that provides metadata or information about a usage scenario—which, as described above, includes a sequence of steps by which an application is used (executed).

When the enterprise software application executes according to a specified usage scenario (i.e., when a usage scenario of the enterprise software application is demonstrated), it produces various software application events. The monitoring engine listens for the application events and maintains a trace of the produced events. Examples of application events have been referred to above. For a particular usage scenario, the nature of software applications is that they execute the same sequence of application events every time that usage scenario is repeated; accordingly, if those events are properly tagged, the software applications can employ the tags to emit information representative of the execution of the tagged software events. This is an important observation, at least in part because a particular usage scenario is deemed to have been executed when a particular sequence of application events is recognized by the systems and methods described herein.

However, a usage scenario can produce a large number—perhaps even hundreds of thousands—of application events, which can make the event sequence running in the enterprise software application difficult and expensive to subsequently recognize or parse through. Accordingly, in one embodiment, a raw event sequence (or trace), produced in step 1301 from the demonstration of the usage scenario, is parsed to identify an important subset of application event sequences whose detection is strongly correlated with the demonstrated usage scenario. The events of the parsed trace identified as being correlated with the usage scenario form what has been referred to herein as a signature, a signature profile, or—depending on context—an active signature profile. As shown in previous figures, for example, FIGS. 9A-9F, the software platform of the systems and methods described herein contains a project workspace module, typically having a graphical user interface (GUI), which makes it possible for a user to visually convert a trace into a signature.

In the process of creating a signature profile, the user may create some ambiguity. In other words, a signature profile created from a trace may match more than one usage scenario in the enterprise software application. This ambiguity can be exploited to effect, if the user chooses to demonstrate an exemplary usage scenario, develop a signature from the resulting trace, and then use the signature to recognize not just the exemplary, but many, if not all, similar usage scenarios. In many embodiments, however, the signature profile uniquely represents the demonstrated usage scenario.

The collected application traces can be ambiguous if more than one usage scenario is demonstrated at a time. Typically, therefore, the systems and methods described herein produce signatures in a controlled, development environment, as mentioned above.

The signatures created from usage scenarios in the development environment can be employed in a production environment. At least in part because of the synergy between the existing application environments and the software instrumentation systems and methods described herein, typically no substantial changes to the application development and deployment environment in which the disclosed software platform works are required.

As shown in FIG. 13 (upper dotted half circle), one of the modules in the software instrumentation platform of the invention enables a set of signatures (representing usage scenarios, which in turn represent components of application business value or risk) to be conveyed, for example, over a network from the development environment to another software module of the platform in the production environment. Optionally, a scheduler determines one or more times or time windows (generally referred to herein as time frames) for monitoring the enterprise applications to detect usage scenarios matching the signature profile.

Referring to the embodiment of FIG. 13, in step 1303, the software module, in the production environment, receives signatures from the module in the development environment and then uses that information to dynamically insert software code into the application to be monitored. Unlike other similar techniques, the code is inserted only where needed, and as specified by the signature. The code can also be removed after use and new code can be inserted when a new or different use scenario is performed. It should be noted that detailed knowledge of the application source code is not required, so that insertion of and changes to, the signatures can be efficiently and quickly executed without substantially affecting the execution of the enterprise software application.

Guided instrumentation, in step 1303 of FIG. 13, refers to a technique of using signatures to determine places in the application where special detection codes are to be dynamically inserted to aid subsequent detection of events that make up a signature. In an exemplary embodiment, the occurrence of an application event, a procedure call for a procedure P for example, is detected and reported. One technique to accomplish this is to get a call back for every procedure called, match against P, and then report the detection of procedure P. However, monitoring every step of the executing application slows down the performance of the application. By using the events specified in the usage scenario signature as instrumentation guides, the signature specifies the sequence of events to be detected (representing, for example, the procedure call P), and this information is used to dynamically tag special detection code to procedure P (and typically nowhere else in the application). This is an efficient detection method, since then only the procedure P plays a role in its own detection.

As seen in step 1304 of FIG. 13, with the instrumentation in place, any time an expected usage scenario is triggered by a user, the modules of the system of the invention efficiently detect individual events, and then match signatures that represent sequences of events. When a detected sequence of events is matched to a defined signature profile, a module can store event data associated with the match, including parameters associated with events of the matched usage scenario. The matches can be stored in a database record that can subsequently be used for evaluating and/or reporting the performance of the executing software application(s) or a measure or risk or potential loss.

The remaining figures illustrate various embodiments illustrative of how the systems and methods described herein can be configured to interact or integrate with various features of enterprise software applications.

Figure 14:
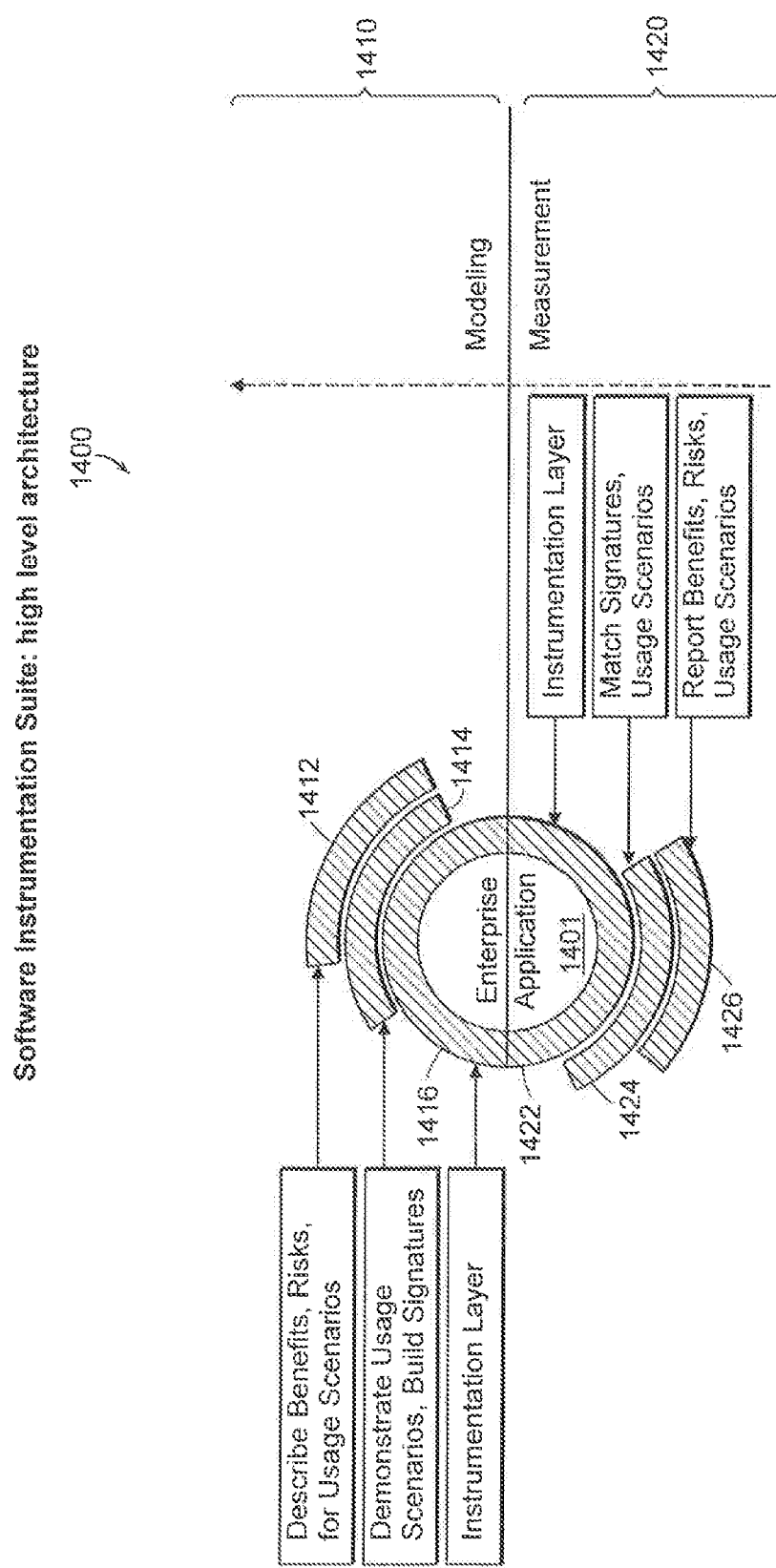
FIG. 14 depicts schematically various layers of a modeling and measurement platform of the software instrumentation systems and methods.

FIG. 14 is a schematic diagram of a high-level architecture 1400 of the software instrumentation systems and methods described herein. As shown in the figure, the systems and methods of the invention are shown as functional layers wrapped around one or more enterprise applications 1401. Each functional layer represents one or more instrumentation method steps or system elements. The top portion 1410 of FIG. 14 shows a modeling (development) environment, and the bottom portion 1420 a measurement (production) environment.

In particular, according to a typical embodiment, the modeling environment 1410 includes a functional layer 1412 wherein benefits, risks, and usage scenarios (i.e., operations) of the enterprise applications 1401 are described or defined—with due consideration of the goals and objectives of the enterprise. In functional layer 1414, the systems and methods described herein demonstrate the usage scenarios defined in the development layer 1412; trace events associated with the demonstrated scenarios; and from the traced events produce signature profiles associated with demonstrated scenarios. Layer 1416 depicts tagging of (instrumenting) the enterprise applications 1410 according to the signatures produced in the layer 1414.

The measurement (production) environment 1420 illustrates an instrumentation layer 1422 wherein the enterprise applications 1410 execute according to a usage scenario (operation) which is to be subsequently identified with (i.e., matched to) a subset of a library of usage scenarios defined or described in the modeling environment 1410. In the layer 1422, a subset of the tags that were inserted in the modeling (development) environment's instrumentation layer 1416 are detected in the yet unidentified scenario (operation). At the functional layer 1424, the detected tags are matched to known usage scenarios defined in the modeling environment. In a typical embodiment, the systems and methods described herein also include a functional layer 1422 that produces a report indicative of how closely the goals and objectives of the enterprise have been met by the enterprise applications 1410 or what level of risk exposure the enterprise faces. The reports can also flag enterprise executives and authorized users of any suspicious process activity, for example, by showing bank officials that a particular teller has accessed customer accounts in an unusual manner.

Figure 15:
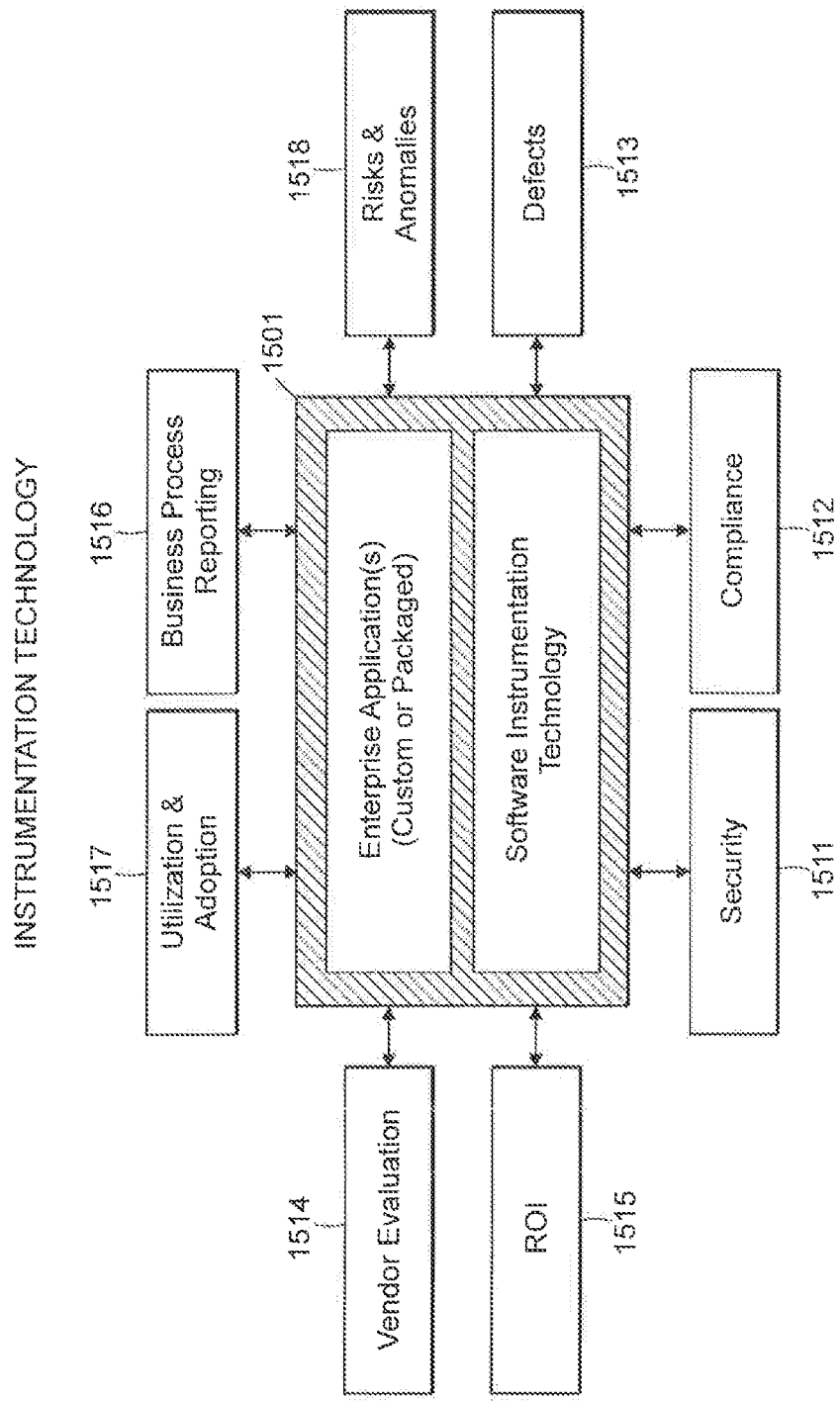
FIG. 15 depicts schematically various applications of the platform of FIG. 13.

FIG. 15 depicts another high-level schematic representation of various applications 1500 of the software instrumentation systems and methods described herein. The software instrumentation systems and methods 1502 are shown in the figure as being deployed around one or more enterprise applications 1501. In various embodiments, the software instrumentation systems and methods 1502 are deployed to interact with one or more platforms for measuring security 1511, compliance 1512, and defects 1513 of the enterprise applications 1501; for vendor evaluation 1514 and return on investment (ROI) 1515; for business process reporting 1516 and resource utilization and adoption 1517; and for assessment of risk, exposure to risk, and anomalies 1518 and the like. These platforms are mere examples and that other application monitoring processes can be efficiently and rapidly performed with the systems and methods described herein.

Figure 16:
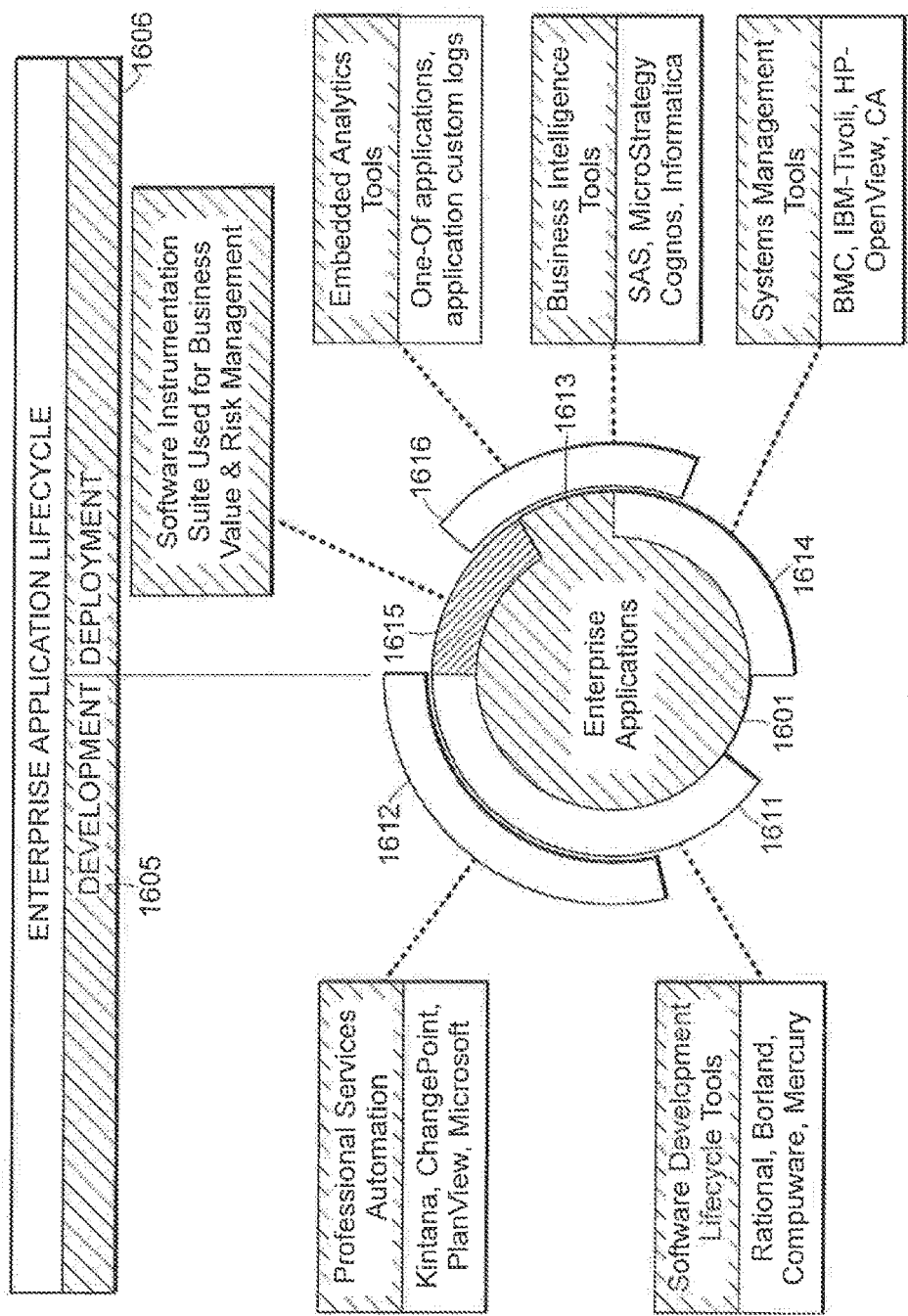
FIG. 16 depicts schematically an application of the software instrumentation systems and methods to business value and risk measurement.

FIG. 16 depicts another high-level diagram of an exemplary application of the software instrumentation systems and methods of the invention and their integration in a business value measurement environment. In particular, FIG. 16 shows, according to one practice, an enterprise application lifecycle 1600 which includes a development portion 1605 (left portion of the figure) and a deployment portion 1606 (right portion of the figure). One or more enterprise software applications 1601 are at the core of the lifecycle 1600, wrapped in various business value measurement functional tool layers.

In one exemplary embodiment, the development portion 1605 of the lifecycle 1600 includes a layer 1611 denoting software development lifecycle tools such as, without limitation, IBM Rational software (IBM Corp., White Plains, N.Y.), CaliberRM (Borland Software Corp., Scotts Valley, Calif.), Compuware Application Development Software (Compuware Corp., Detroit, Mich.), Mercury Application Development Environment (Mercury Computer Systems, Inc. (Chelmsford, Mass.), and others. In this embodiment, the lifecycle 1600 includes a layer 1612 denoting professional services automation tools such as, without limitation, Kintana (Mercury Computer Systems, Inc.), Changepoint (Compuware Corp.), PlanView Portfolio Management Software (PlanView United States, Austin, Tex.), Microsoft Business Solutions (Microsoft Corp., Redmond, Wash.), and others.

The deployment portion 1606 of the lifecycle 1600, according to this embodiment, includes a layer 1613 of business intelligence tools such as, without limitation, SAS Business Intelligence Client Tools (SAS Institute GmbH, Heidelberg, Germany), MicroStrategy Business Intelligence Software Solutions (MicroStrategy, Inc., McLean, Va.), Cognos (Cognos Business Intelligence and Performance Management Software Solutions (Cognos, Ottawa, ON, Canada), Informatica (Informatica Corp., Redwood City, Calif.), and others.

Another layer of the deployment portion 1606 of this embodiment of the lifecycle 1600 is the systems management tools layer 1614, which includes, for example and without limitation, BMC (BMC Software, Houston, Tex.), IBM-Tivoli (IBM Corp., White Plains, N.Y.), HP-OpenView (HP, Palo Alto, Calif.), CA (Computer Associates, Islandia, N.Y.), and others. Another layer of the deployment portion 1606 of this embodiment of the lifecycle 1600 is the business value measurement (and risk assessment) layer 1615 where the software instrumentation systems and methods described herein are deployed. Yet another layer of this embodiment includes an embedded analytics tolls layer 1616.

Part 2: Using Raw to Data for Fraud Management

The invention as discussed in Part 1 manages fraud by monitoring, recording, and analyzing software events associated with uses of an enterprise application in part by instrumenting the code of the enterprise application. We now discuss another aspect of the invention that identifies fraudulent uses of an enterprise application and need not require instrumenting code. In particular, the method aggregates and organizes logs of raw data associated with process steps in the use of the applications, archives the data in a manner that facilitates efficient access to and processing of the data, investigates potential fraudulent scenarios using the archived data, and uses the results of the investigations to identify patterns of data that correspond to high risk usage scenarios and/or process steps. Additionally, archived data is compared against the identified patterns to detect matches, and the invention thereby automatically detects fixture occurrences of similar high risk usage scenarios and issues appropriate alerts and reports. In this aspect of the invention, raw data is provided as one or more existing logs of data to be processed by the methods described herein. Each element of raw log data typically corresponds to a transaction record that logs an action performed with a particular enterprise application.

Figure 17:
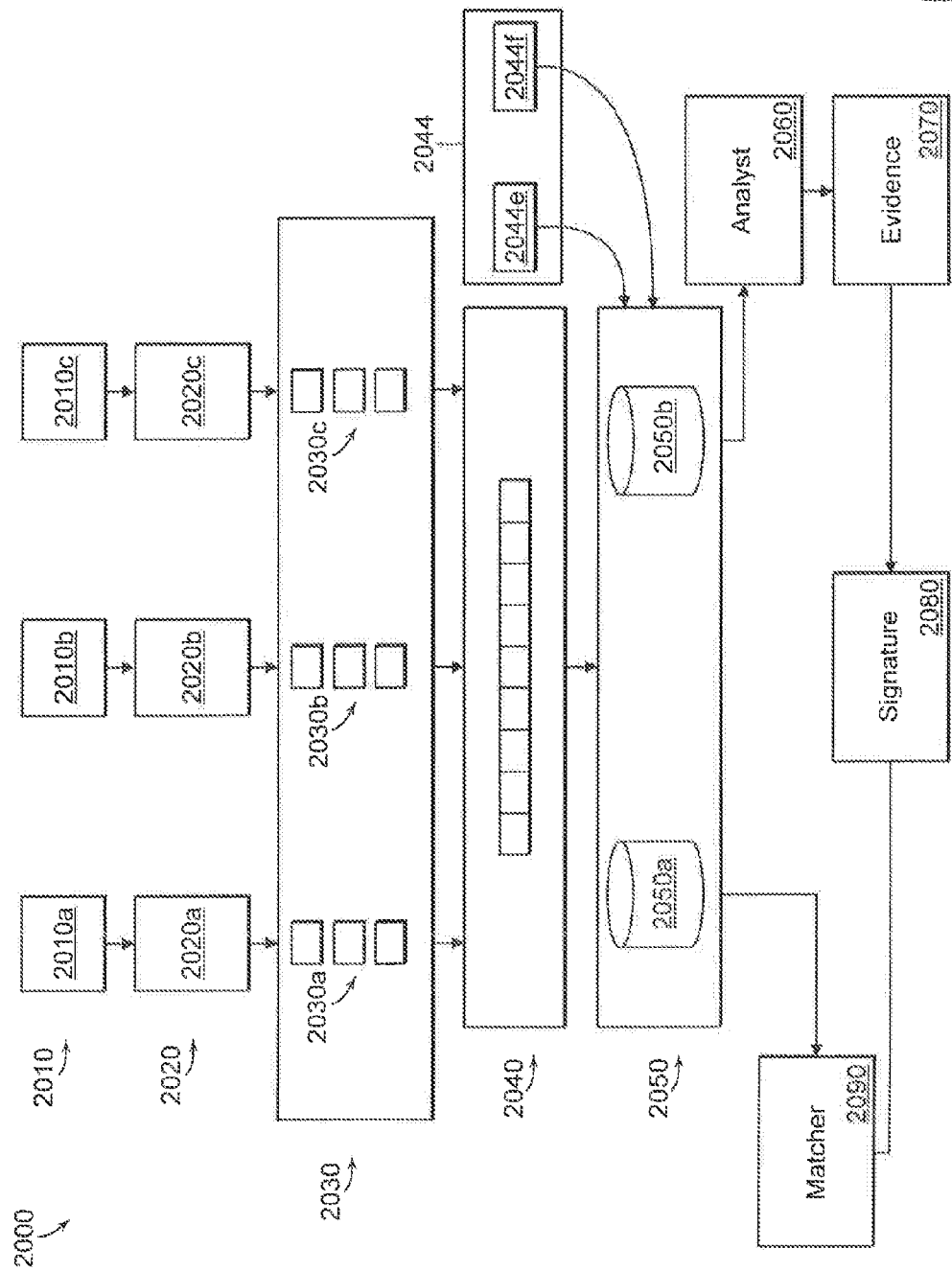
FIG. 17 depicts the steps in a fraud management method that does not require instrumenting an enterprise application.
Figure 18:
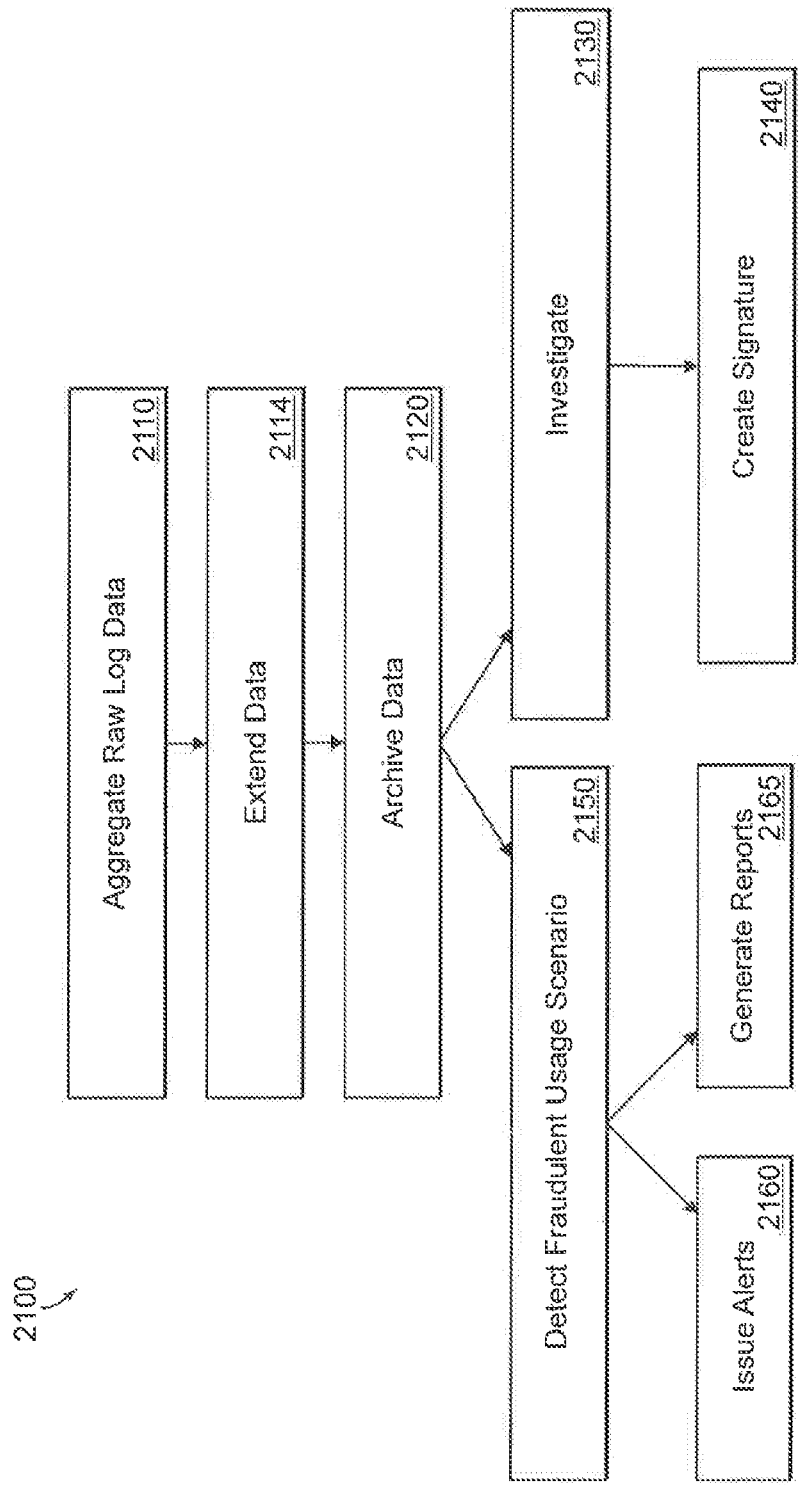
FIG. 18 depicts a system which implements the steps of FIG. 17.

To this end, FIGS. 17 and 18 depict a fraud management system 2000 and steps 2100 for using the system. The system 2000 includes users or user groups 2010, applications 2020, raw data 2030, aggregated data 2040, reference data 2044, archives 2050, a fraud analyst 2060, a set of evidence related to a case of fraud 2070, a signature indicative of a case of fraud 2080, and a matcher to detect cases of fraud 2090.

More specifically, FIG. 17 depicts multiple applications 2020*a-c*. As discussed in Part 1, the applications can include custom applications or commercially available packaged applications. In general, the applications serve to automate business processes and support process execution for industries such as, for example, banking, lending, and insurance. While the operations of the various applications 2020 may be interdependent (i.e., they may belong to a common application suite), in FIG. 17 they operate substantially independently from each other.

Each application is used by a respective user or group of users 2010*a-c*, and upon use of the application, raw data 2030 associated with the uses of the applications is generated. The raw data is stored in logs 2030*a*, 2030*b*, and 2030*c*. Typically, as in FIG. 17, each application generates its own respective log. The raw data 2030 can be generated and logged in a number of ways, and in one aspect, the applications 2020*a*, 2020*b*, and 2020*c* each generate data in different manners and log data in different formats. For example, one application may generate an Information Management System (IMS) transaction log on a mainframe, another may generate an application specific log on a windows server, and another may generate a log on a UNIX-based system. In certain embodiments, some of the applications 2020*a-c* are instrumented and may log software runtime events as described in Part 1.

The logged raw data 2030 includes data associated with process steps of the application. A process step generally refers to a single action taken by a user in the context of a use of an application. For example, "Employee A opens Client B's account record" and "Employee A credits Client B's account with a fee rebate" are each process steps. Each process step generally includes one or more low level log events. By way of example, the process step "Employee A opens Client B's account record" may include lower level log events such a login event, an account selection event, and an account viewing event. For each process step, the logged raw data can include an identifier of a person that performed the process step, a timestamp indicating when the process step was performed, a duration of time during which the process step was performed, an identifier of a client account associated with the process step, and/or a categorization of the process step (i.e., a name of the type of process step performed). Of course, the relevant data that is stored will vary depending on the nature of the particular process step at hand and the particular application being used, and this in part leads to variability of the data within the logs.

However, the logs can also include data of a finer gain of resolution. In the case of an instrumented application, the logged data includes software runtime events (as discussed in Part 1). As mentioned above, each process step typically includes several software runtime events.

In one aspect, because each application 2020*a-c* generates logs of data 2030*a-c* in different forms and each log 2030*a-c* includes different data due to variability in the process steps that are logged, it is difficult and inefficient to conform and store all of the data in a single database using a fixed schema. The difficulties are compounded since the data may be semistructured, depending on the application generating the log. Additionally, the logs may contain vast quantities of data, such as data corresponding to six months or more of application use. The logs may contain quantities of data on the order of 1 terabyte, 10 terabytes, or more. We now discuss methods to aggregate and archive the data to facilitate efficient fraud management that could not be achieved by simply conforming and storing all of the information in a single database.

More specifically, with respect to FIGS. 17 and 18, step 2110 includes aggregating the data to form a set of aggregated data 2040. This step serves the purpose of sequentially organizing the raw data into chronological order. As will be discussed below, many of the fraud detection and analysis methods of this invention relate to identifying temporal and/or sequential relationships between process steps. Thus, the sequential aggregation 2110 facilitates this subsequent analysis.

An additional purpose of this step is, in part, to collect the disparate raw data 2030 of the various applications 2020 so that the data can be brought together and organized in the archiving step 2120. In particular, certain business processes require performing process steps across more than one of the applications 2020a-c. Since each application 2020a-c typically maintains an independent and unique log, the data should be aggregated from the logs in order to detect fraudulent uses across multiple applications.

After aggregating 2110 the raw data 2030, the data is extended 2114 with reference data.

As indicated above, raw log data 2030 typically includes transaction records associated with actions performed by an enterprise application. The transaction record includes a time stamp together with data that characterizes the action performed by the enterprise application. Although such records generally provide a complete record of the transaction from the point of view of the individual enterprise application, they usually lack reference data that is needed for detecting potentially fraudulent usage patterns. Transaction logs also lack reference data that is needed to generate reports on the results of potentially fraudulent usage pattern searches. The system illustrated in FIGS. 17 and 18 therefore enhances, or extends, the raw transaction records with reference data, as we describe below.

Reference data 2044 is static or semi-static information that is associated with fields of the transaction records. For example, a transaction record may include a numerical field designating the identification number of the enterprise employee who performed the transaction. An example of reference data is the employee record for that employee, which would typically include the employee's ID, social security number, name, job code, date of hire, home address, as well as up to about 50 additional fields. Employee records are kept in reference data source 2044e, which is typically maintained by the human resources department of the enterprise.

As a second example, a transaction record may include a numerical field with the account number of the account to which the transaction was performed. The system may be interested in reference data associated with that account number. Such data is stored in account records 2044f, which include fields such as account number, customer name, account type, and customer home address.

In order to make reference data available for suspicious pattern detection (described below), aggregated data 2040 is "pre-joined" with reference data 2044 to create extended, or enhanced, aggregated data that is stored in archives 2050. Using the example described above, the system pre-joins, or extends, a transaction log having a single employee ID field with corresponding reference data 2044e fields for employee name, job code, date of hire and home address. Thus a single employee ID field is extended to a total of five fields. Similarly, if the transaction record includes an account number, the system extends the record with corresponding reference data 2044f fields for customer name, account type, and customer home address, extending the account information from a single field to four.

As shown in FIG. 18, extending data step 2114 is performed after data aggregating step 2110 and before data archiving step 2120. However, raw log files can be extended before they are aggregated in step 2110. For example, a log file produced by a single enterprise application can be extended with reference data and then aggregated with other extended log files. In either case, a raw data field that is to be extended with reference data will be archived in extended form, regardless of the order in which the data was extended.

In general, a field is extended regardless of the application 2020 that generated a particular record containing the field. For example, using retail banking as an example, the employee ID field is extended with the same reference data when it appears in raw data generated by any of bank applications 2020a, 2020b, or 2020c. However, this uniform treatment is not required, and in some circumstances it may be advantageous to extend certain fields for specific applications only and not for others. For example, one enterprise application may produce a log which contains the number of the account on which each transaction is performed. If the fraud scenarios for this application do not refer to information about the employee's own accounts, there is no need to extend the record with information about the employee's own accounts. However, the fraud scenarios may refer to account owner information when transactions are performed using a second application, and so for the second application it is useful to extend transaction logs to include employee account information, and be able to determine if a particular account is owned by the employee who performed the transaction.

The data extension process uses reference data that is up-to-date as of the time of the transaction logging. This ensures that transactions are extended with reference data that is not obsolete. For example, when an employee changes his job, his employee record is correspondingly updated. The next time a transaction record associated with that employee is extended, it is joined with the current version of employee records 2044e, ensuring that the archived extended data 2050 contains within it an accurate snapshot of the employee's situation at the time that the transaction was performed. If, on the other hand, the employee information is joined with the transaction data at a later time, for example at a time when a fraud investigation is launched, the employee record will reflect the employee's job at that later time, not his job at the time the transactions of interest occurred. Such non-contemporaneous data extension can mask behavior patterns that characterize fraud.

Raw data 2030 typically includes transaction log files containing records, each of which is rendered unique by a time stamp corresponding to the time at which the transaction took place. Whenever a new transaction occurs, a new record is created and stored. Reference data 2044, on the other hand, either remains unchanged, or changes only at specific times. For example, reference data describing what transaction each transaction code corresponds to changes very rarely. On the other hand, the job code corresponding to an employee ID changes every time the employee changes his job. Unlike transaction data, new reference data is not added to the earlier data but instead replaces it. If historical reference data is needed, it has to be retrieved from an archive. In addition, reference data may not include a time stamp as it is not associated with a particular time.

Reference data 2044 is stored in databases, or other data structures that are independent of enterprise applications 2020 that generate raw data 2030. For example, employee records 2044e are maintained in a database that is set up and maintained by the human resources department of an enterprise. Account records 2044*f* are set up and maintained by the retail customer division of the enterprise. Each enterprise has a set of such internal reference data sources, each of which may be maintained by a different department within the enterprise. In some cases, reference data 2044 must be cleaned before it can be used, or additional reference data used in order to make links between the transaction data and the reference data.

Reference data may also come from parties outside the enterprise. For example, when extending a transaction record with an address of an employee or of a customer, the entry in the reference data may be present in one of a number of equivalent forms, such as "Suite 150, 100 Main Street" or "100 Main Street, No. 150." In order to allow easier identification of addresses that correspond to each other, the address field is also extended with a unique address identification number from a third party postal address database.

The enterprise provides reference data 2044 from its various divisions at regular intervals in the form of a flat data file. Alternatively, the enterprise's reference data is obtained by directly accessing one or more relational databases that house the reference data without creating a flat reference data file.

Although transaction data and reference data are quite different in nature, some kinds of transaction data are generated from reference data. For example, in a retail banking application, customer account balances as they stand at the end of the day are given a time stamp corresponding to midnight, and added to the transaction records. This "interpolation" relies on knowing that an account balance will not change between logged transactions.

In a reverse process, some kinds of reference data are derived from transaction data. In one method, a particular transaction or set of transactions are converted into reference data by removing the transaction time stamps from the records. For example, in a retail banking application, the bank balance of an account appearing in the log for the last transaction of the day is converted into an end-of-day balance, and added as reference data to all transaction records for that account for the following day. This enables easy searching for aggregate withdrawals that exceed a threshold percentage of the prior day's closing balance. In a second example, the system extracts reference data from a transaction log that includes account maintenance actions, such as account open, account close, add signer, or change address. Such transactions are treated as semi-static account status reference information, and can be used to enhance a teller transaction log. For example, a flag can be included if the account address has been changed within the thirty days preceding the transaction. This enables easy searching for a fraud scenario featuring large withdrawals from an account for which the mailing address was changed in the past thirty days.

In another method, reference data are obtained by computing statistics from transaction data. Using retail banking again as an example, one such statistic is the average number of transactions performed by a selected group of tellers during the past week. Computed daily, this statistic is added during extension step 2114 to raw logs of bank teller transactions. The inclusion of this reference data makes it easy to search for tellers exceeding the current average number of transactions by a selected threshold percentage. Computed reference data can also be derived from sources other than transaction logs, such as a data feed with statistics from a particular market or industry segment. For example, in a brokerage application, the system uses a data feed provided by a stock exchange to compute the volume of trades for a particular option contract over a specified time interval. By using the computed average trading volume for the contract as reference data, it is easy to search for fraud scenarios in which a single trade exceeds two standard deviations above the average.

Prior to joining reference data 2044 with the raw logs, the system identifies the unique keys that are present in both transaction data 2040 and in reference data 2044. For example, for employee records 2044*e* the system generally uses the employee ID as the key, and for account information 2044*f* the system uses the account number. Prior to extending raw data 2040 with employee information, the system converts employee records 2044*e* into a reverse index by employee ID. Then for every occurrence of a record of raw data 2040 that has an employee ID field, the system extends the record with the desired fields from the entry corresponding to that employee ID in employee record 2044 reverse index. Similarly, the system creates a reverse index of account information records 2044*f* by account number prior to joining the account information with raw data 2040. Once it has served its purpose an enabled joining of raw data with reference data, the selected keys or unique identifier fields may not themselves be retained in archives 2050.

Extending data step 2114 increases the size of the raw data 2040. The amount of extension performed depends on what additional fields are required for the suspicious pattern detection and for the reporting of leads that might represent fraud. In some cases, the required extension increases the size of a record of raw data 2040 by just one or two fields. In other cases, the extension can result in an extended record having more than twice the number of fields of the original raw data record. For example, in the retail banking scenario described above, raw transaction log 2040 initially includes no home address fields. However, after extending aggregated raw data 2040 with employee records 2044*e* and account records 2044*f*, the extended record includes two home address—that of the employee and that of the account holder. A search of this extended data record can reveal whether the two addresses are the same, which might be one of the elements of a suspicious pattern.

As indicated above, the system extends raw data 2040 with reference data that supplies fields that are of interest for detecting potentially fraudulent usage patterns. For example, the system can be interested in searching for patterns relating to the employee's job, employment history, home address, transaction volume, home address of the holders of the accounts transacted with, and so on, none of which are present in the raw transaction log. Since extension step 2114 fully joins such reference fields to the transaction data, they can be searched as quickly and easily as the original transaction data fields without the need to retrieve information from reference data sources 2044. This ability to search rapidly and uniformly through both the original raw data fields and the joined reference data field motivates the joining of reference data, and justifies the associated expansion or "bloat" in the size of the transaction data.

Reference data fields are also selected to provide data for reporting the results of searches for fraudulent patterns of behavior. For example, a set of leads that includes the names of suspected employees is more informative than the list of the ID numbers of the suspected employee. Similarly, a report showing the name of the suspected transactions, for example "withdrawal of funds" is more informative than a list showing transaction codes. Thus raw data is extended with certain kinds of reference data used for reporting purposes, even if those kinds of data are not used to search for potentially fraudulent usage patterns.

Reference data that is not selected for display in a report may still be searched by an analyst who is interested in pursuing a particular lead or set of leads. For example, if a particular employee is identified in several potentially fraudulent usage patterns, an analyst may wish to access all the employee data associated with that employee in employee records 2044*e*, not just the data selected for the report. The employee record reverse index described above facilitates such forensic research because the analyst can key directly into the employee records using the unique identifier in the archived extended transaction data 2050, without the need to retrieve information from reference data source 2044*e*.

After the raw log data is extended in step 2114, it is archived 2120 into one or more archives 2050. In some embodiments, such as in FIG. 17, there is more than one archive. The multiple archives can each index different types of data. For example, one archive can serve to maintain an index of the previous day's events, while another archive can serve to index live events as the data is logged and aggregated. In FIG. 17, archive 2050*a* archives data generated from applications 2020*a* and 2020*b*, while archive 2050*b* archives data generated from application 2020*c*.

In the archiving step 2120, the data associated with each process step or software event is treated as a logical document. The documents are partitioned into indexes. An index is a collection of documents included in a logical folder. Each folder contains documents associated with process steps or software events taking place within a prescribed interval of time. For example, the folders can be created daily, with each folder including data associated with that day's uses. The appropriate time period used for each folder typically depends on the volume of data being logged by the applications as well as archiving requirements of the enterprise. For example, an enterprise may require that five weeks of transactions be available for fraud analysis, and each week archive a week's worth of data that is six weeks old. In such an enterprise, the indexes are partitioned by week. Some exemplary time periods for each folder include one hour, one day, and one week.

The system then indexes the aggregated, extended data in order to provide a data structure that can be searched rapidly. The preferred indexing method is reverse, or inverted indexing, in which the system indexes the aggregated extended data into an inverted index using a chosen subset of the fields of the extended transaction log. The fields chosen for inverse indexing are fields that are of interest for fraud scenario searches, and generally include fields whose entries are unique identifiers. For example, in retail banking, such fields include employee ID, account ID, and account owner ID. On the other hand, the dollar amount of a transaction would typically not be suitable for indexing because it is not unique and is not a field that will be searched. Associated with each of the indexed entries in the inverted index is a set of extended transaction records containing the entry.

With respect to archive 2050*a*, various fields associated with the process step data, such as type of action or process step, person responsible, timestamp, client account involved, are included in an inverted index. For each of these fields, the index includes an entry which specifies the contents of the field, and location information specifying where data associated with that field's contents can be found within the data. For example, an entry specifying "Employee A" will include location information identifying data related to process steps that were performed by Employee A. In one embodiment, the location information for a process step is an offset specifying how far into the data that process step's data is located. The location information can include one or more logical pointers to the corresponding process step's data. Location information can be added to the index in real time as new data is logged and aggregated, or at predefined times. Similarly, new index entries corresponding to process step or event fields can be defined and indexed in real-time or at predefined times.

After the data is archived 2120, the data is fed to matcher 2090 to detect fraudulent uses 2150, and also sent to an analyst 2060 to conduct an investigation 2130.

Discussing the investigation 2130 first, the aggregation, partitioning, and indexing methods discussed above provide the analyst 2060 with easily searchable archives of data that facilitate fraud investigation. The analyst attempts to investigate and identify fraudulent usage scenarios. As mentioned in Part 1, a usage scenario generally refers to one or more related process steps along with temporal or sequential relationships between the process steps. For example, "Employee A opens Client B's account record" and "Employee A prints Client B's account record" are each process steps, and "Employee A opens Client B's account record and then prints Client B's account record" is a usage scenario. Similarly, "Employee A opens Client B's account record and prints Client B's account record after 30 seconds" is a usage scenario. Usage scenarios can include various numbers of process steps and/or temporal and sequential relationships among the process steps.

As mentioned, the analyst 2060 attempts to investigate fraudulent usage scenarios using the archives 2050. To this end, the analyst 2060 queries the archive for data associated with suspected fraudulent usage scenarios, and uses data returned by the archive 2050 as evidence in an investigation. For example, if the analyst 2060 suspects Employee A of fraud, the analyst 2060 can query the archive for "Employee A." The archive will use its inverted indexing to identify data associated with process steps and software events involving Employee A, and return this data to the analyst 2060. The matcher 2090, discussed in more detail below, can search across multiple indexes in parallel in order to return the appropriate data. The analyst uses this data as evidence 2070, which is used as the basis for an investigation. Ultimately, the analyst 2060 determines whether or not a fraudulent usage scenario occurred.

If the analyst 2060 determines that no fraudulent usage scenario occurred, then typically the analyst 2060 takes no action. However, if the analyst determines that a fraudulent usage scenario occurred, then the method proceeds to create 2140 a signature 2080 indicative of the fraudulent usage scenario. The signature is used by the matcher 2090 to detect additional fraudulent uses similar to the one investigated by the analyst 2060. In Part 1, in the context of instrumented software, a signature for a usage scenario generally referred to a pattern of one or more software runtime events indicative of that usage scenario. The signature included a subset, or in some cases all, of the software runtime events that were triggered during the usage scenario. In the context of the current discussion, this is still the case when processing data from an instrumented application. However, a signature for a usage scenario of non-instrumented applications is generally a pattern including one or more process steps and associated sequential or temporal constraints among the process steps indicative of the usage scenario. Examples of these kinds of signatures will be discussed below.

Based on the evidence 2070, the analyst 2060 determines a signature 2080 indicative of the fraudulent usage scenario.

For example, the analyst may suspect Employee A of fraud, query the archive accordingly, and after investigation discover a fraudulent usage scenario in which the employee performed five consecutive "account lookups" and "account prints" for five respective clients, each within 30 seconds of each other, all during his lunch break. In this case, the analyst 2060 may create a new signature 2080 corresponding to "Employee A performs five consecutive account lookups and prints within 30 seconds or less during lunchtime." Alternately, the analyst 2060 can define several new signatures 2080 including "Account lookup during lunchtime," "Five consecutive account lookups and prints," and "Employee A performs any process step." Although described in words herein, the signatures are codified in program logic in the matcher 2090. If analyzing software event data from an instrumented application, the signatures will take on the same form as described in Part 1 of this application. The new signatures 2080 are provided to the matcher 2090, which we now discuss.

The matcher 2090 performs the step 2150 of automatically detecting fraudulent usage scenarios. To this end, the matcher 2090 maintains a set of active signatures, including new signatures 2080 identified in step 2140, and is fed data from the archives 2050. The data can be streamed to the matcher 2090 from multiple sources. In FIG. 17, the data is streamed from both archive 2050a and 2050b. The matcher 2090 compares the data from the archive against the active signatures to identify fraudulent usage scenarios similar to the usage scenarios characterized by the respective active signatures. The matcher can run in real-time, examining log data as it is aggregated and archived, or only at prescribed time periods such as at the end of each business day. The matcher functions automatically in that it includes program code to provide its functionality with limited human oversight.

Figure 19:
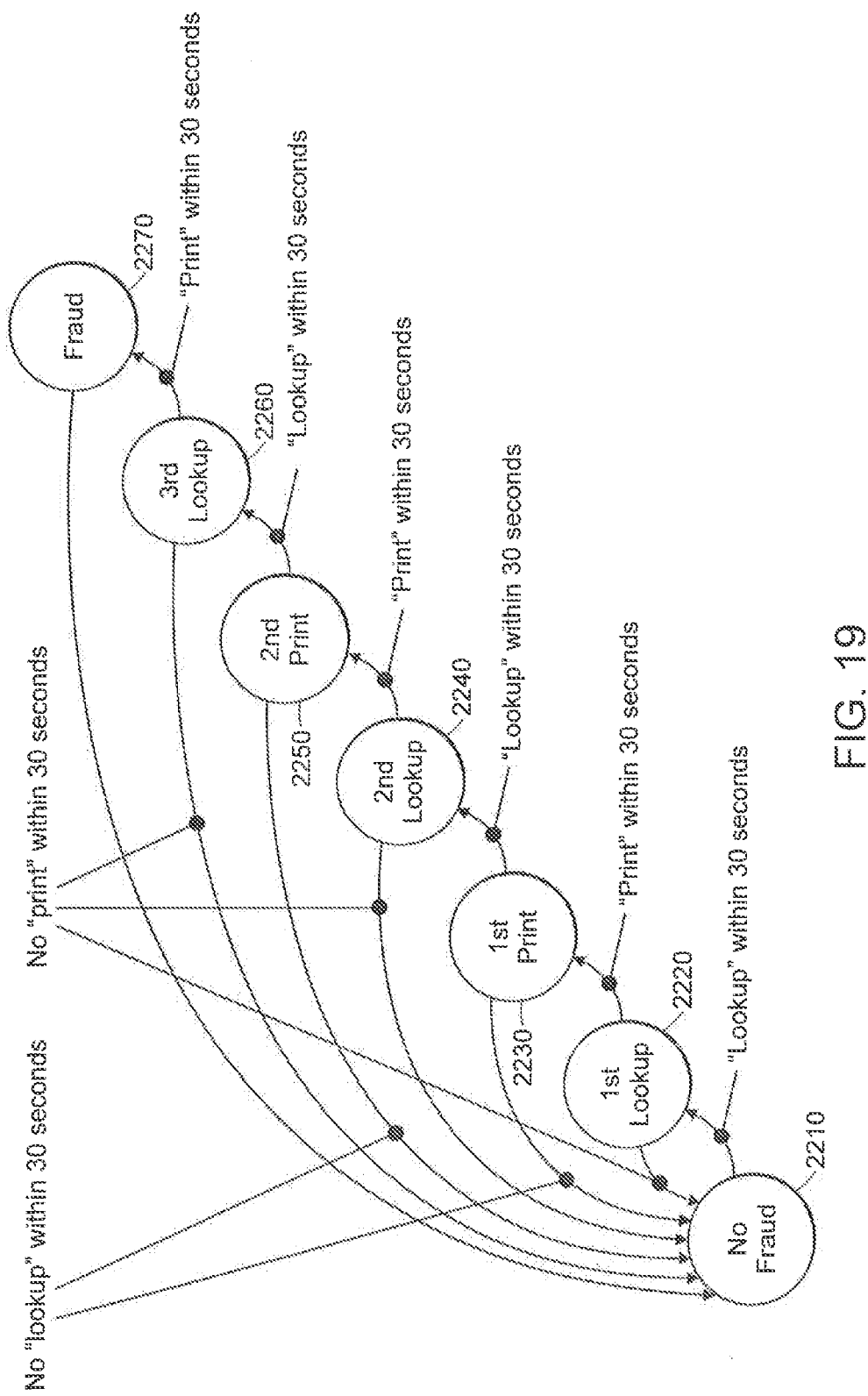
FIG. 19 illustrates the operation of the matcher 2090 of FIG. 17.

In one aspect, the matcher 2090 contains program code to identify a state of the system with respect a signature in order to identify partial matches to the signature, and ultimately identify a match should the data warrant it. By way of example, consider the following signature indicative of a fraudulent usage scenario: Employee A performs three consecutive "account look-ups" follow by "prints," with each process step occurring within 30 seconds of the next process step. As the aggregated and archived data is fed into the matcher 2090, the matcher keeps track of the state of a system corresponding to the signature. The system 2200 and its possible states are depicted in FIG. 19. Prior to the arrival of data, the system begins in state 2210 with an indication of no fraud. When data arrives indicating the process step "Employee A performs account lookup," the system moves into state 2220. If subsequent data indicates that Employee A did not perform a "print" process step within 30 seconds of the lookup process step 2220, the system returns to state 2210. Otherwise, the system proceeds to state 2230, indicating a partial match containing one lookup and print. The system proceeds similarly, either going back to state 2210 or proceeding on through states 2240, 2250, and 2260. If a print occurs within 30 seconds of system 2200 entering state 2260, the system proceeds to state 2270, indicating a potentially fraudulent usage scenario. The matcher than issues alerts and reports (step 2165) as will be discussed below.

In one aspect, a method according to system 2200 of FIG. 19 is implemented by a logical queue. Using the example of FIG. 19, as the system proceeds through the states, the corresponding process steps (i.e., first lookup, first print, second lookup, etc.) are added to the queue. When the system 2200 returns to state 2210, the matcher 2090 clears the queue. In one aspect, the matcher 2090 maintains several queues corresponding to the several active signatures. This allows for parallel and high speed matching.

We now discuss exemplary signatures that can be used with the system, and in particular by the matcher 2090. As mentioned above, the signatures are generally patterns related to sets of process steps. The patterns sometimes include constraints related to the process steps. A pattern in this context generally refers to one or more process steps and temporal or sequential relationships and/or constraints among the process steps. A constraint in this context generally refers to a condition involving process steps and temporal/sequential relationships between them that can be evaluated to be either true or false. The signatures may involve just one process step. In this case, the signature may include the person responsible for the process step. For example, if Employee Y is highly suspect of committing fraud, a signature can be "Any process step performed by Employee Y." The signature may include a number of consecutive times an employee performed a particular type of process step, for example, "Employee A performs 5 consecutive account lookups." The signature may include temporal information related to the process step, such as when the process step occurred. For example, a signature may be "Process step performed by Employee A during Employee A's lunch break." The temporal information may be an atypical duration of time, such as "Employee A opened Client B's account without closing it within 2 hours." The temporal information may include a number of times that a particular type of process step is performed during a prescribed period of time, for example "Employee A performs 5 account lookups in less than 10 minutes."

The signatures may involve more than one process step, and include sequential or temporal relationships between the process steps. The sequential/temporal relationships may include the time separating and/or the order of two or more process steps, for example "Employee A performs an account lookup followed by a print within 30 seconds." They may include a number of times a sequence of process steps occurs during a predefined duration of time, for example "Account lookup followed by print, 5 times, within 10 minutes." They may include a number of consecutive times a sequence of process steps takes place, for example "Account lookup followed by print 100 consecutive times."

The signatures comprising constraints can include Boolean operations. For example, in one instance it was noted in a bank application that miscellaneous "debits" with neither a corresponding "credit" nor a corresponding "debit reversal" indicated potentially fraudulent behavior. A signature for this is "Debit AND NOT (credit within 10 minutes OR debit reversal within 30 minutes)."

If the matcher 2090 determines that a portion of the aggregated and archived data fed into the matcher 2090 matches a signature, it can issue an alert, such as an email to an appropriate authority. It can also issue a report similar to the reports discussed in the context of Part 1 of this application.

The components of system 2000 are generally located at the same site as the enterprise application. In addition to the components shown in FIG. 17, the system can include additional functional blocks. In one embodiment, a report server and generator is responsible for generating and displaying reports once the matcher 2090 has identified a potentially fraudulent usage scenario. The reports as similar to the reports described with respect to Part 1 of this application. Similarly, an alert server and generator is responsible for generating and issuing alerts to appropriate authorities once the matcher 2090 has identified a potentially fraudulent scenario. The system can also include a database which serves as a repository for one or more of data, reports, and alerts associated with identified fraudulent usage scenarios. Each of these functional blocks will generally be in communication with the system 2000 depicted in FIG. 17, and typically they are in communication with the matcher 2090.

Particular aspects and implementation details of the invention discussed above may vary depending on the intended application and use of the invention. The examples given above are for illustrative purposes only, and other embodiments consistent with the invention and not explicitly discussed exist. Furthermore, the embodiments of the invention related to FIGS. 17-19 may be used in conjunction with other aspects of the invention discussed herein.

Exemplary platforms that the systems and methods described herein support include, but are not limited to, the following: Windows XP for the project workspace and the OAL; Oracle or SQL Server for the Repository (Database) management; applications written in Java, C++, using environments such as J2EE, COM, NET, and on platforms such as Windows XP/2000, AIX, HP-UX, Linux, and Solaris for the tracer, signature profiler, detector, scheduler, and matcher.

The contents of all references—including, but not limited to, patents and patent applications—cited throughout this specification, are hereby incorporated by reference in entirety.

Many equivalents to the specific embodiments of the invention and the specific methods and practices associated with the systems and methods described herein exist. Accordingly, the invention is not to be limited to the embodiments, methods, and practices described herein, but is to be understood from the following claims, which are to be interpreted as broadly as allowed under the law.

What is claimed is:

1. A method for identifying a fraudulent use of an application, the method comprising:
   obtaining an existing log of data generated from uses of an application, the existing log of data including a plurality of data fields;
   indexing reference data by at least a first unique key and a second unique key, each unique key corresponding to a different data field;
   extending the existing log of data with at least the reference data indexed by the first unique key and the reference data indexed by the second unique key;
   identifying a location of a data field within the extended data;
   indexing the data field and information specifying the location in a data structure;
   identifying a signature pattern representative of potentially fraudulent behavior;
   comparing at least a portion of the data structure to the signature pattern to identify the fraudulent use; and
   outputting a representation reflecting a result of the comparison.

2. The method of claim 1, wherein identifying a location of a data field includes identifying a location of at least one of a name field, a time field, a place field, an action type field, or an account identification field.

3. The method of claim 1, wherein obtaining the existing log of data includes obtaining data associated with respective process steps performed by respective users during the uses of the application.

4. The method of claim 1, wherein comparing at least a portion of the data structure comprises obtaining the data structure and a query related to a suspected fraudulent usage scenario of the application to an analyst, the data structure providing location information of data satisfying the query.

5. The method of claim 1, wherein the signature pattern is a constraint, and comparing at least a portion of the data structure to the pattern includes searching for data that satisfies the constraint.

6. The method of claim 1, wherein the signature pattern is a constraint including Boolean operations, and comparing at least a portion of the data structure to the pattern includes evaluating the Boolean expressions with respect to the indexed data.

7. The method of claim 1, wherein the identified signature pattern comprises one of a set of active signatures or a pattern identified from the extended data.

8. A non-transitory computer-readable storage medium storing software that, when executed by at least one processor, causes the at least one processor to perform a method, the method comprising:
   obtaining an existing log of data generated from uses of an application, the existing log of data including a plurality of data fields;
   indexing reference data by at least a first unique key and a second unique key, each unique key corresponding to at least one of a different data field;
   extending the existing log of data with at least the reference data indexed by the first unique key and the reference data indexed by the second unique key;
   identifying a location of a data field within the extended data;
   including the data field and information specifying the location in a data structure;
   identifying a signature pattern representative of potentially fraudulent behavior;
   comparing at least a portion of the data structure to the signature pattern to identify the fraudulent use; and
   outputting a representation reflecting a result of the comparison.

9. The storage medium of claim 8, wherein identifying a location of a data field includes identifying a location of at least one of a name field, a time field, a place field, an action type field, or an account identification field.

10. The storage medium of claim 8, wherein obtaining the existing log of data includes obtaining data associated with respective process steps performed by respective users during the uses of the application.

11. The storage medium of claim 8, wherein comparing at least a portion of the data structure comprises obtaining the data structure and a query related to a suspected fraudulent usage scenario of the application to an analyst, the data structure providing location information of data satisfying the query.

12. The storage medium of claim 8, wherein the signature pattern is a constraint, and comparing at least a portion of the data structure to the pattern includes searching for data that satisfies the constraint.

13. The storage medium of claim 8, wherein the signature pattern is a constraint including Boolean operations, and comparing at least a portion of the data structure to the pattern includes evaluating the Boolean expressions with respect to the indexed data.

14. The storage medium of claim 8, wherein the identified signature pattern comprises one of a set of active signatures or a pattern identified from the extended data.

15. An electronic device comprising:
at least one processor; and
software stored on a storage medium, the software configured to cause the at least one processor to perform a method comprising:
obtaining an existing log of data generated from uses of an application, the existing log of data including a plurality of data fields;
indexing reference data by at least a first unique key and a second unique key, each unique key corresponding to a different data field;
extending the existing log of data with at least the reference data indexed by the first unique key and the reference data indexed by the second unique key;
identifying a location of a data field within the extended data;
including the data field and information specifying the location in a data structure;
identifying a signature pattern representative of potentially fraudulent behavior;
comparing at least a portion of the data structure to the signature pattern to identify the fraudulent use; and
outputting a representation reflecting a result of the comparison.

16. The device of claim 15, wherein identifying a location of a data field includes identifying a location of at least one of a name field, a time field, a place field, an action type field, or an account identification field.

17. The device of claim 15, wherein obtaining the existing log of data includes obtaining data associated with respective process steps performed by respective users during the uses of the application.

18. The device of claim 15, wherein the signature pattern is a constraint, and comparing at least a portion of the data structure to the pattern includes searching for data that satisfies the constraint.

19. The device of claim 15, wherein the signature pattern is a constraint including Boolean operations, and comparing at least a portion of the data structure to the pattern includes evaluating the Boolean expressions with respect to the indexed data.

20. The device of claim 15, wherein the identified signature pattern comprises one of a set of active signatures or a pattern identified from the extended data.

* * * * *